US012457188B2

(12) United States Patent
Deng et al.

(10) Patent No.: US 12,457,188 B2
(45) Date of Patent: Oct. 28, 2025

(54) INTERACTION DATA PROCESSING METHOD AND APPARATUS, PROGRAM PRODUCT, COMPUTER DEVICE, AND MEDIUM

(71) Applicant: TENCENT TECHNOLOGY (SHENZHEN) COMPANY LIMITED, Shenzhen (CN)

(72) Inventors: Ailu Deng, Shenzhen (CN); Liqiang Liu, Shenzhen (CN); Guoxiong Deng, Shenzhen (CN); Xinxin Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 58 days.

(21) Appl. No.: 18/484,895

(22) Filed: Oct. 11, 2023

(65) Prior Publication Data
US 2024/0039884 A1 Feb. 1, 2024

Related U.S. Application Data

(63) Continuation of application No. PCT/CN2023/078320, filed on Feb. 27, 2023.

(30) Foreign Application Priority Data

Mar. 10, 2022 (CN) .......................... 202210240413.1

(51) Int. Cl.
*H04L 51/52* (2022.01)
*G06F 3/0482* (2013.01)
(Continued)

(52) U.S. Cl.
CPC ............ *H04L 51/52* (2022.05); *G06F 3/0482* (2013.01); *G06F 3/04855* (2013.01);
(Continued)

(58) Field of Classification Search
CPC .. G06F 3/0482; G06F 3/04855; G06F 3/0486; G06F 3/04886; H04L 51/52; H04L 51/21
See application file for complete search history.

(56) References Cited

U.S. PATENT DOCUMENTS 11,232,406 B1 * 1/2022 Michelson .............. H04L 51/18
11,570,129 B2 * 1/2023 Hong .................. G06F 3/04845
(Continued)

FOREIGN PATENT DOCUMENTS

CN 1941706 A 4/2007
CN 104391625 A 3/2015
(Continued)

OTHER PUBLICATIONS

The World Intellectual Property Organization (WIPO) International Search Report for PCT/CN2023/078320 May 24, 2023 11 Pages (including translation).

*Primary Examiner* — Tadesse Hailu
(74) *Attorney, Agent, or Firm* — Anova Law Group, PLLC

(57) ABSTRACT

An interaction data processing method performed by an object device includes displaying a social interface, receiving a preset operation performed on a target social object among the at least one social object, and aggregating and displaying one or more social messages transmitted by the target social object in the social interface.

20 Claims, 22 Drawing Sheets

(51) Int. Cl.
*G06F 3/04855* (2022.01)
*G06F 3/0486* (2013.01)
*G06F 3/04886* (2022.01)
*H04L 51/21* (2022.01)

(52) U.S. Cl.
CPC ........ *G06F 3/0486* (2013.01); *G06F 3/04886* (2013.01); *H04L 51/21* (2022.05)

(56) References Cited

U.S. PATENT DOCUMENTS

| | | | | |
|---|---|---|---|---|
| 11,621,864 | B2* | 4/2023 | Giacalone | H04L 12/185 709/206 |
| 11,750,539 | B2* | 9/2023 | Treat | H04L 51/212 709/206 |
| 11,785,132 | B2* | 10/2023 | Tokuchi | H04L 51/04 455/466 |
| 11,871,151 | B2* | 1/2024 | Gal | H04L 12/1822 |
| 12,034,680 | B2* | 7/2024 | Desserrey | H04L 51/043 |
| 2014/0298210 | A1* | 10/2014 | Park | H04L 12/1822 715/758 |
| 2016/0094671 | A1* | 3/2016 | Hirakata | H04N 21/4788 709/206 |
| 2018/0239495 | A1 | 8/2018 | Sharifi et al. | |
| 2018/0367495 | A1* | 12/2018 | Kim | H04L 51/56 |
| 2019/0102061 | A1* | 4/2019 | Fu | H04L 51/216 |
| 2019/0281003 | A1* | 9/2019 | Liu | H04L 65/403 |
| 2020/0028815 | A1* | 1/2020 | He | H04L 51/52 |
| 2021/0385175 | A1* | 12/2021 | Dalonzo | H04L 51/56 |
| 2021/0409354 | A1* | 12/2021 | Jang | H04L 51/18 |
| 2022/0030037 | A1* | 1/2022 | Liu | H04L 51/04 |

FOREIGN PATENT DOCUMENTS

| | | |
|---|---|---|
| CN | 107105107 A | 8/2017 |
| CN | 108268206 A | 7/2018 |
| CN | 110019028 A | 7/2019 |
| CN | 110147188 A | 8/2019 |
| CN | 110825298 A | 2/2020 |

\* cited by examiner

INTERACTION DATA PROCESSING METHOD AND APPARATUS, PROGRAM PRODUCT, COMPUTER DEVICE, AND MEDIUM

CROSS-REFERENCE TO RELATED APPLICATIONS

This application is a continuation of International Application No. PCT/CN2023/078320, filed on Feb. 27, 2023, which claims priority to Chinese Patent Application No. 202210240413.1, entitled "INTERACTION DATA PROCESSING METHOD AND APPARATUS, PROGRAM PRODUCT, COMPUTER DEVICE, AND MEDIUM" filed with the China National Intellectual Property Administration on Mar. 10, 2022, which are incorporated by reference in their entirety.

FIELD OF THE TECHNOLOGY

This application relates to the technical field of data processing, and in particular, to an interaction data processing technology.

BACKGROUND OF THE DISCLOSURE

In a social platform, multiple users can interact with each other with social messages on social interfaces of the social platform. For example, the social interface can be a group chat interface for a chat group, and the social messages of the users can refer to group chat messages on the group chat interface.

In related applications, when all or some of messages sent by a particular user in the chat group on the group chat interface need to be viewed, it is usually needed to leave a current public chat window component and go to a search interface where all or some of the messages sent by the particular user in the chat group can be searched and viewed. However, this method has a long search path and is separate from the chat context, resulting in poor message viewing effect and low viewing efficiency.

SUMMARY

In accordance with the disclosure, there is provided an interaction data processing method performed by an object device and including displaying a social interface, receiving a preset operation performed on a target social object among the at least one social object, and aggregating and displaying one or more social messages transmitted by the target social object in the social interface.

Also in accordance with the disclosure, there is provided a computer device including: one or more processors and one or more memories storing one or more computer programs that, when executed by the one or more processors, cause the one or more processors to display a social interface, receive a preset operation performed on a target social object among the at least one social object, and aggregate and display one or more social messages transmitted by the target social object in the social interface.

Also in accordance with the disclosure, there is provided a non-transitory computer-readable storage medium storing one or more computer programs that, when executed by one or more processors, cause the one or more processors to display a social interface, receive a preset operation performed on a target social object among the at least one social object, and aggregate and display one or more social messages transmitted by the target social object in the social interface.

BRIEF DESCRIPTION OF THE DRAWINGS

To describe the technical solutions in this application or in the related art more clearly, the following briefly introduces the accompanying drawings for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

The technical solutions in this application are clearly and completely described below with reference to the accompanying drawings in this application. Apparently, the described embodiments are merely some rather than all of the embodiments of this application. All other embodiments obtained by a person of ordinary skill in the art based on the embodiments of the present application without making creative efforts shall fall within the protection scope of the present application.

This application relates to a block chain related technology. In this application, social messages of social objects may be uploaded onto a block chain to ensure the immutability and authenticity of the social messages of the social objects.

This application also relates to a cloud technology. The cloud technology involved in this application mainly refers to use of "cloud" to achieve backend storage and frontend displaying of social messages of social objects.

Firstly, this application can display a prompt interface or a pop-up window before and during acquisition of user related data (such as social messages of social objects on a social platform and user data of related operations triggered by social messages on a social platform). This prompt interface or pop-up window is used for prompting that users are currently acquiring their relevant data, so that this application only starts relevant steps of acquiring the user related data after obtaining a confirmation operation performed by the users on the prompt interface or pop-up window. Otherwise (namely, when the confirmation operation performed by the user on the prompt interface or pop-up window is not obtained), this application ends the relevant steps of obtaining the user related data, namely, no user related data is obtained. In other words, all user data acquired in this application is acquired with the consent and authorization of a user, and acquisition, use, and processing of the relevant user data need to comply with the relevant laws, regulations, and standards of relevant countries and regions.

First, related concepts in this application are explained:

AIO: All In One, a public chat window component.

When a user participates in many different types of conversations such as friends, groups, and public accounts, in order to provide the user with a unified interaction experience, an application provides a chat window component shared by different conversations. A typing operation, a clicking operation, and other behaviors of the user in the component can be regarded as being consistent.

IM service: instant messaging, which is an Internet-based instant messaging service, a real-time communication system allowing two persons or multiple persons to use a network to transmit text messages, files, voices, and videos in real time.

Figure 1:
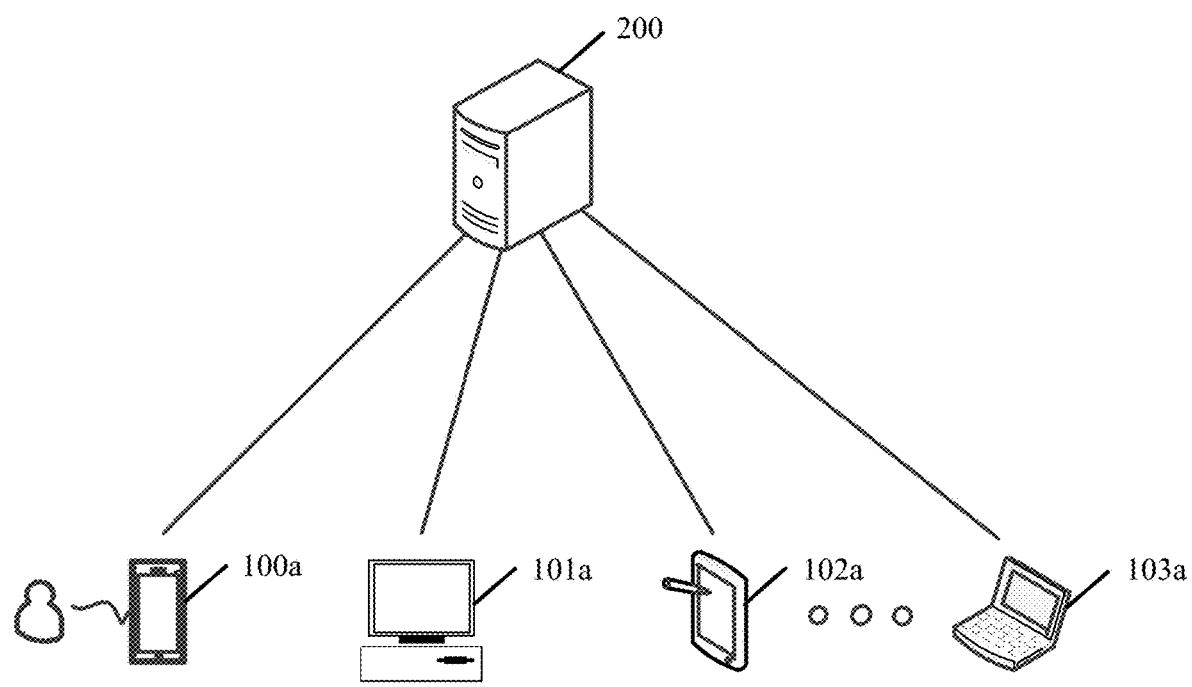
FIG. 1 is a schematic structural diagram of a network architecture according to an embodiment of this application.

Referring to FIG. 1, FIG. 1 is a schematic structural diagram of a network architecture according to an embodiment of this application. As shown in FIG. 1, the network architecture may include a server 200 and a terminal device cluster. The terminal device cluster may include one or more terminal devices. There will be no limitation on a quantity of terminal devices here. As shown in FIG. 1, a plurality of terminal devices may specifically include terminal device 100a, terminal device 101a, terminal device 102a, . . . , and terminal device 103a. As shown in FIG. 1, terminal device 100a, terminal device 101a, terminal device 102a, . . . , and terminal device 103a may all be connected to the server 200 through a network, so that each terminal device can interact with the server 200 by data through network connection.

The server 200 as shown in FIG. 1 may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms. The terminal devices may be: a smart phone, a tablet computer, a notebook computer, a desktop computer, a smart TV, a vehicle-mounted terminal, and other intelligent terminals. Communication between terminal device 100a and the server 200 is taken as an example below to specifically describe the embodiments of this application.

Figure 2:
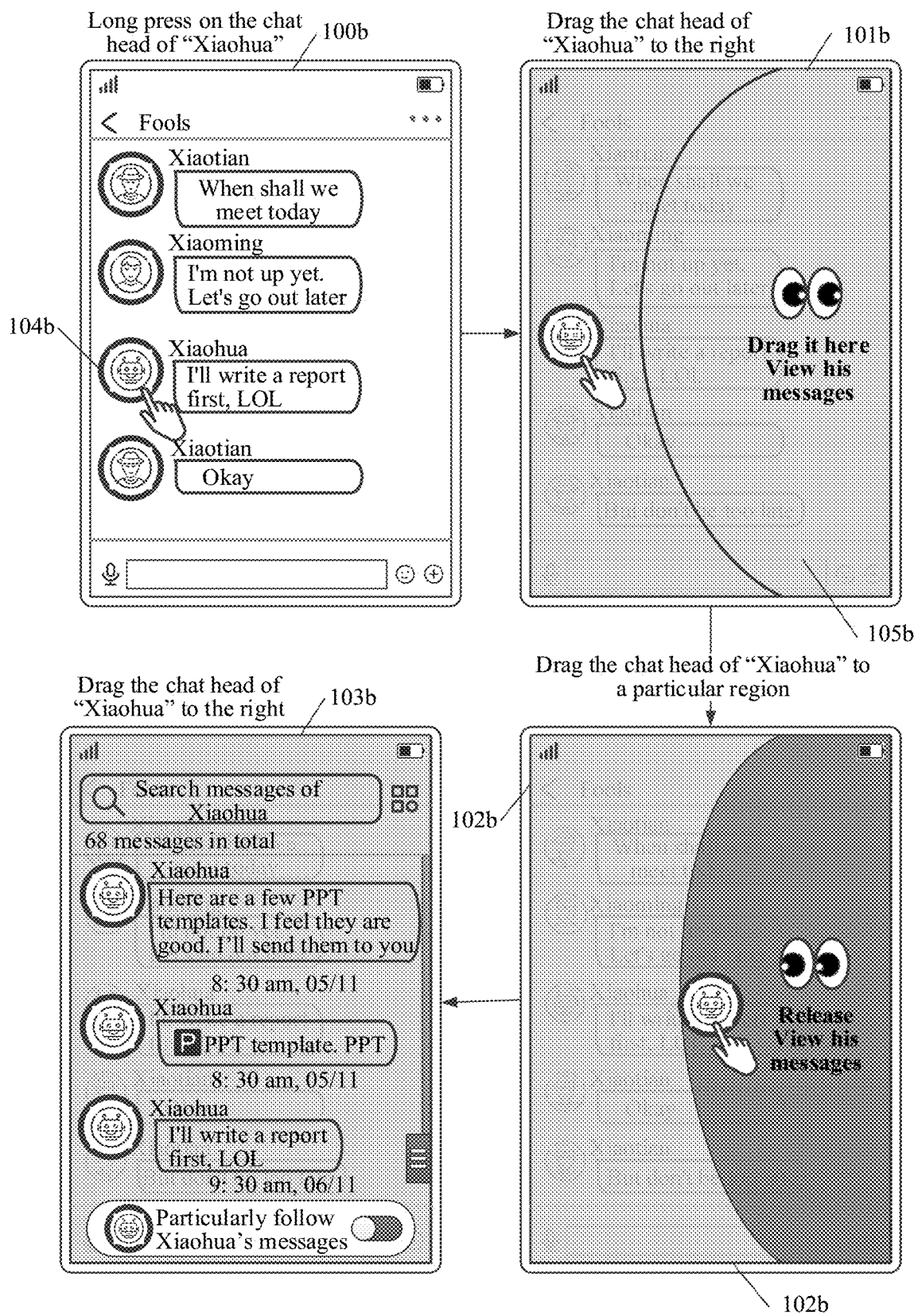
FIG. 2 is a schematic diagram of a scenario of processing interaction data according to this application.

Referring also to FIG. 2, FIG. 2 is a schematic diagram of a scenario of processing interaction data according to this application. Terminal device 100a may include a social platform (also referred to as an interactive application). The social platform may be any platform capable of achieving message aggregation and message interaction, and the server 200 may be a backend server of the social platform.

As shown in FIG. 2, the social platform may be an instant messaging application. Interface 100b may be a social interface. The social interface can be a group chat interface in the instant messaging application of terminal device 100a. More specifically, social interface 100b may be a group chat interface for a group named "Fools," and social interface 100b may contain group messages (which can be referred to as social messages) of several social objects. The several social objects may include group members Xiaotian, Xiaoming, and Xiaohua. As shown in FIG. 2, social interface 100b displays social messages of Xiaotian: "What time shall we meet today" and "Okay." Social interface 100b also displays social messages of Xiaoming: "I'm not up yet. Let's go out later." Social interface 100b also displays social messages of Xiaohua: "I'll write a report first, LOL."

Moreover, social interface 100b also displays chat heads of the respective social objects (including chat head 104b of Xiaohua). Therefore, terminal device 100a can display interface 101b on the basis of a long press operation performed by a user (for example, a user holding terminal device 100a) on chat head 104b in the social interface. In interface 101b, the user can also be allowed to drag chat head 104b of Xiaohua to the right until chat head 104b of Xiaohua is dragged to region 105b (which can be referred to as a preset region) and is displayed on interface 102b. The preset region of interface 101b may also display prompt information: "Drag it here to view his message." The prompt information is used for prompting the user to drag chat head 104b of Xiaohua to the preset region.

In interface 102b, chat head 104b has been dragged to the preset region. In this case, prompt information of "Release to view his message" will also be displayed in the preset region. Therefore, at this time, the user can release the hand that presses chat head 104b, and terminal device 100a can display the chat head to interface 103b. Interface 103b can be used for aggregating and displaying the social messages (namely, group chat messages, namely, group messages) sent by Xiaohua in interface 100b. Interface 103b is an interface of a model floating layer. The social messages sent by Xiaohua in interface 100b are aggregated and displayed in the model floating layer. The model floating layer is a floating layer independently displayed on the top of social interface 100b.

In the model floating layer, all group chat messages sent by Xiaohua in the group named "Fools" can be displayed. The group chat messages sent by Xiaohua in the group include a group message "Here are a few PPT templates. I feel they are good. I'll send them to you" and a group message "File of PPT template" sent by Xiaohua at 8:30 am on November 5, and a group message "I'll write a report first, LOL" sent by Xiaohua at 9:30 am on November 6.

The social messages historically sent by Xiaohua and displayed in the model floating layer may include social messages obtained locally by terminal device 100a. If a social message of a local social object is deleted or cleared, the social messages historically sent by Xiaohua and displayed in the model floating layer may also be pulled by terminal device 100a from the server 200.

In a content aggregation scenario (such as a group chat scenario), this application can quickly select, search and view social messages of a designated social object (such as Xiaohua) in a temporary model floating layer without leaving original social interface 100b, which improves the efficiency of reading social messages of social objects and shortens a path of reading social messages of social objects.

Figure 3:
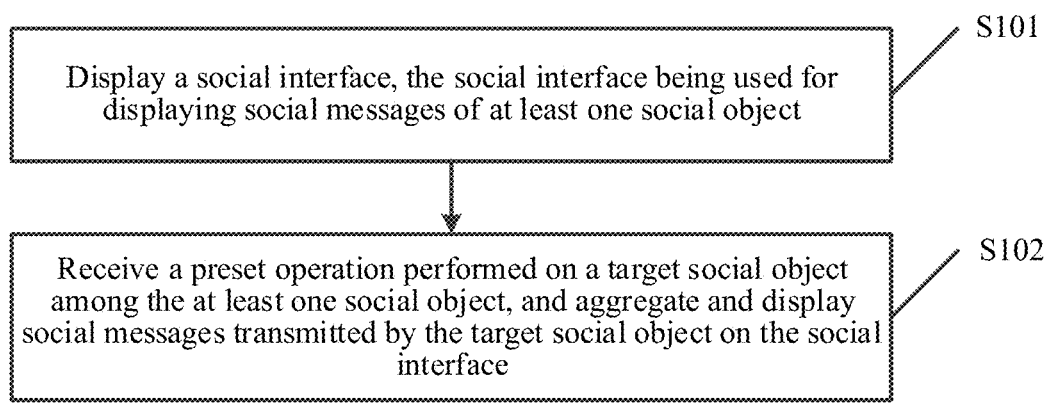
FIG. 3 is a flowchart of an interaction data processing method according to this application.

Referring to FIG. 3, FIG. 3 is a flowchart of an interaction data processing method according to this application. An executive body in this application can be an object device. The object device can be a computer device or a computer device cluster composed of a plurality of computer devices. The computer device may be a server or a terminal device. As shown in FIG. 3, the method may include:

S101: displaying a social interface, the social interface being used for displaying social messages of at least one social object.

In one possible implementation, the executive body in this application can be an object device. The object device can be a device held by any user. The object device may have a social platform. The social platform may be a platform for socialization between users. The social platform can be a content aggregation platform in any form such as an application (APP), a mini program, or a webpage.

The object device may display a social interface. For example, the object device may display a social interface according to an interface display operation. The social interface may be an interface in the social platform. The social interface may be used for displaying social messages of at least one social object. The at least one social object may be social objects that can perform socialization on the social platform. A quantity of the at least one social object may be determined according to an actual application scenario without any restrictions.

In one possible implementation, the above interface display operation can be an operation used for displaying the social interface. For example, the social interface can be a group chat interface, and the interface display operation can be a display operation performed on the group chat interface in a message prompt list.

The social interface may display social messages sent by the at least one social object. The social interface can represent different interfaces in different content aggregation scenarios, and the social messages can represent different messages in different content aggregation scenarios.

For example, the social platform may be an instant messaging application (also referred to as an instant messaging platform). The instant messaging platform may include a multi-person chat group (which can be referred to as a social group). Therefore, the above at least one social object can be all group members in the social group, and the social messages of the social object can refer to group messages (also referred to as group chat messages) sent by the social objects in the social group. The social interface can be a group chat interface of the social group. The group chat interface is used for displaying the group chat messages sent by the group members of the social group in the social group. In this scenario, the social interface can be displayed through an AIO (a public chat component).

As another example, the social platform may be a platform on which information (such as personal moments) is posted. The at least one social object can be all users (or friend users of a user holding the object device in the social platform) who can post information on the social platform.

The social interface is an interface used for displaying the information posted by the social objects. The information posted by the social objects can be the social messages sent by the social objects in the social interface. For example, the information posted by the social objects may be personal moments, forwarded information, shared information, and the like of a user.

As another example, the social platform may be a channel (such as a forum) where multiple persons can engage in online discussion. The at least one social object may be all users that can engage in online discussion on the social platform. The social interface may be an online discussion interface of the channel. The social interface can be used for displaying a content that is discussed by the at least one social object online on the channel. The content that is discussed by the social objects online on the channel may be the social messages sent by the social objects.

From the above description, it can be seen that this application can be applied to all multi-person content aggregation scenarios, such as a channel (a real-time online large-scale virtual organization), a group, and a moments space. In this content aggregation scenario, it is possible to search and view the social messages of the social objects.

In one possible implementation, the at least one social object may include a followed social object. A quantity of the followed social object may be L. A value of L may be determined according to an actual application scenario. L will be less than or equal to a total quantity of the at least one social object. The L followed social objects may be set, on the social platform, by the user holding the object device.

For example, if the social interface is a group chat interface for a group which includes several group members, the L followed social objects can be group members set to be followed among the several group members. As another example, if the social interface is an interface for posting information on the social platform, the L followed social objects can be followed objects set among objects that post information on the social platform. For still another example, if the social interface is a multi-person discussion channel interface, the L followed social objects can be followed social objects set among objects included in the channel.

By setting the followed social objects in the content aggregation scenario, it is possible to pay special attention to social messages of the followed social objects in the content aggregation scenario, thereby fully learning and understanding the social messages sent by the followed social objects.

Therefore, if the L followed social objects have unread social messages, the social interface can also display a prompt control. This prompt control can be used for prompting that the followed social objects have unread social messages, and the prompt control can also be used for prompting a quantity of the unread social messages. The unread social messages prompted refer to unread social messages sent by at least one followed social object among the L followed social objects in the social interface.

The unread social messages of the followed social objects can refer to social messages that are sent by the followed social objects and have not been exposed and displayed on a device interface of the object device (or a device interface of a device associated with the object device). It can be understood that the unread social messages of the followed social objects are social messages that are sent by the followed social objects and have not been viewed by the user holding the object device.

The social platform in the object device can be configured to log in to an object account (namely, a user account).

Therefore, the device associated with the object device can refer to another device with a social platform that also logs in to the object account.

In one possible implementation, the above display control can be a pop-up window control independently displayed in the social interface, or can be a control included in the social interface. The display control can contain object identifiers (such as chat heads or alias of the social objects) of the followed social objects that have the unread social messages, and the display control is also used for quickly aggregating and displaying the unread social messages of the followed social objects.

S102: receiving a preset operation performed on a target social object among the at least one social object, and aggregating and displaying social messages transmitted by the target social object in the social interface.

In one possible implementation, the target social object may be any social object among the at least one social object, and the social messages of the social object needs to be viewed. The social interface may contain an object identifier of the target social object, and the object identifier can be a chat head (such as a user chat head), an alias, or the like of the social object.

Therefore, the implementation of receiving a preset operation performed on the target social object among the at least one social object may be receiving a triggering operation performed on the object identifier of the target social object in the social interface.

The triggering operation performed on the object identifier of the target social object may include but is not limited to any of the following: performing long press on the object identifier of the target social object in the social interface, and dragging the object identifier of the target social object along the social interface to a preset region of the social interface (the preset region may be set according to an actual application scenario); or, performing long press on the object identifier of the target social object in the social interface, and dragging the object identifier of the target social object along the social interface (which may be a horizontally rightwards direction of the social interface or any direction of the social interface) by a preset distance. The preset distance may be set according to an actual application scenario.

The triggering operation above performed on the object identifier of the target social object is only an example. In fact, any shortcut gesture can be used to perform the triggering operation on the object identifier of the target social object, which can be specifically determined according to an actual application scenario.

For example, if the object identifier of the target social object may be located at a left edge position of the social interface, the triggering operation performed on the object identifier of the target social object may include: performing long press on the object identifier of the target social object, and dragging the object identifier of the target social object along a right side (a horizontally rightwards direction or an obliquely rightwards direction) of the social interface to a preset region, and the preset region may be a region, close to a right edge position in the social interface.

As another example, if the object identifier of the target social object may be located at a left edge position of the social interface, the triggering operation performed on the object identifier of the target social object may include: performing long press on the object identifier of the target social object, and dragging the object identifier of the target social object along a right direction (a horizontally rightwards direction or any other directions) of the social interface by a dragging distance that reaches (is equal to or greater than) a preset distance. The dragging distance may be a distance from a start position (a position before dragging) of the object identifier of the target social object to an end position to which the object identifier is dragged.

Figure 4:
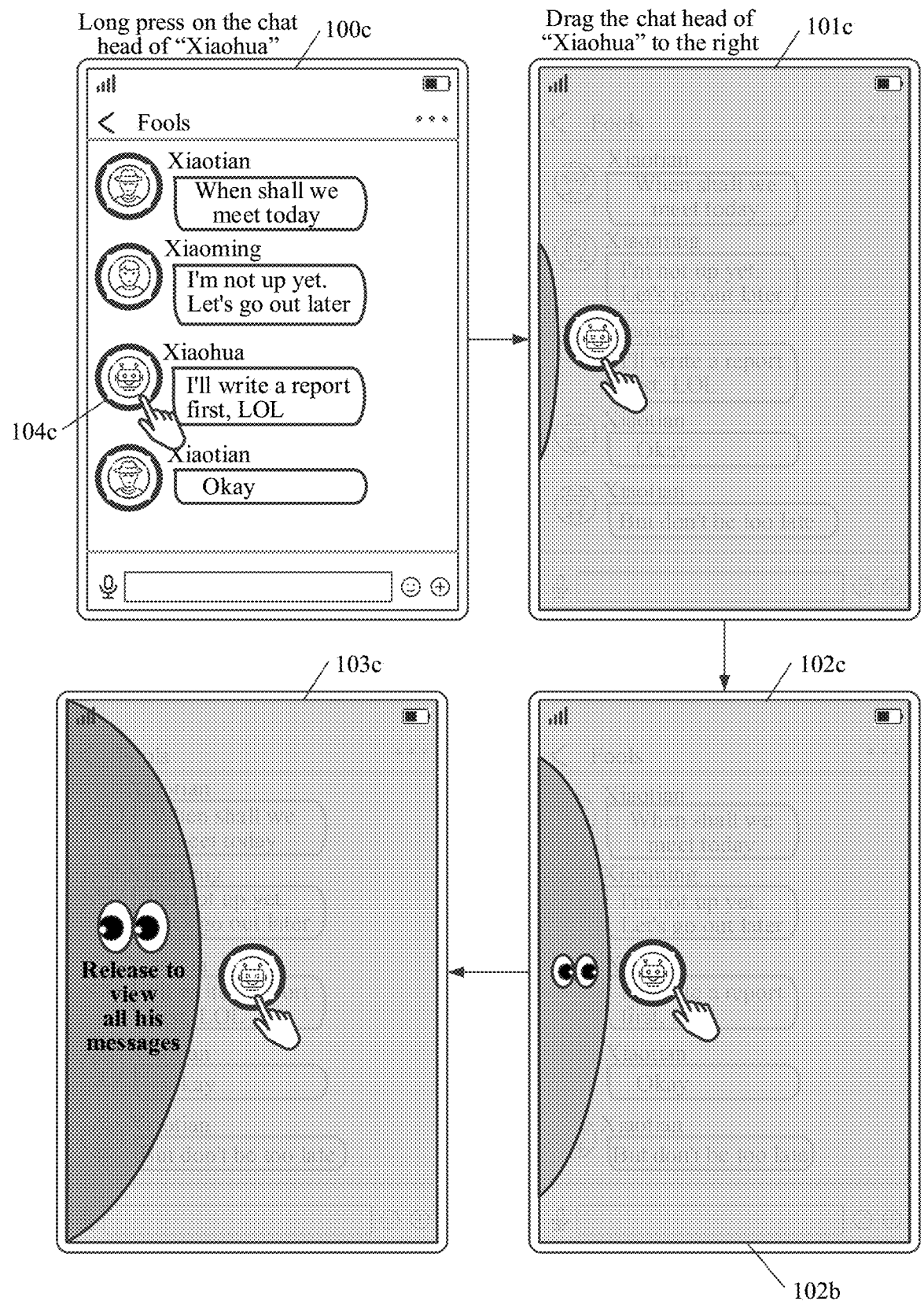
FIG. 4 is a schematic diagram of a scenario of reading social messages according to this application.

Referring to FIG. 4, FIG. 4 is a schematic diagram of a scenario of reading social messages according to this application. As shown in FIG. 4, the above social interface may be group chat interface 100c of the "Fools." Group chat interface 100c includes social messages of a plurality of social objects (such as Xiaotian, Xiaoming, and Xiaohua), and group chat interface 100c also includes object identifiers (chat heads) of the respective social objects, such as chat head 104c of Xiaohua.

Therefore, long press can be performed on chat head 104c of Xiaohua in interface 100c. The object device can display interface 101c instead of interface 100c. In interface 101c, chat head 104c of Xiaohua can be continuously dragged to the right, thus obtaining interface 102c. Dragging is continued. When a dragging distance to the right reaches a distance threshold (which can also be referred to as a preset distance and can be determined according to an actual application scenario), interface 103c is displayed. Interface 103c further includes prompt information "Release to view all messages." At this time, the hand that drags chat head 104c can be released, and the object device can aggregate and display all group messages sent by Xiaohua in the group "Fools". In this process, Xiaohua is the target social object mentioned above, and the preset operation performed on Xiaohua includes: a triggering operation performed on chat head 104c of Xiaohua. The triggering operation may include performing long press on chat head 104c of Xiaohua, and dragging chat head 104c along the social interface (for example, the horizontally rightwards direction of the social interface) by a dragging distance that is greater than or equal to a distance threshold (namely, a preset distance).

Therefore, the object device can aggregate and display, according to the triggering operation performed on the object identifier of the target social object in the social interface, the social messages sent by the target social object in the social interface. The social messages can be all social messages locally stored in the object device and sent by the target social object in the social interface. Or, the social messages can be all social messages stored in a backend (for example, a backend device of the social platform) and sent by the target social object in the social interface. The aggregated and displayed social messages of the target social object specifically include which social messages of the target social object, which is determined according to an actual service policy.

In one possible implementation, in another scenario, the target social object can also refer to a followed social object among the at least one social object. The social interface displays the above prompt control (the prompt control can be referred to as a small ear in the social interface). The prompt control is a control used for prompting that the followed social object has unread social messages.

Therefore, the implementation of receiving a preset operation performed on the target social object among the at least one social object is receiving a triggering operation performed on the prompt control. The triggering operation performed on the prompt control can be a clicking operation performed on the prompt control, or the like. In this case, the target social object can refer to a social object that has unread social messages among L followed social objects.

Therefore, the object device can aggregate and display, according to the triggering operation performed on the prompt control, the unread social messages sent by the followed social object in the social interface (that is, aggregate and display the unread social messages sent by the target social object in the social interface).

In one possible implementation, in the above case (where the target social object is the followed social object having the unread social messages), when a quantity of the target social object is greater than 1 (namely, there are a plurality of target social objects, which are the social objects having the unread social messages among the L followed social objects), the object device can classify, aggregate and display, in response to the triggering operation performed on the prompt control (the response here may refer to a corresponding response made for the triggering operation performed on the prompt control), the unread social messages separately corresponding to each target social object, and the unread social messages of one target social object are a type of unread social messages.

Figure 5:
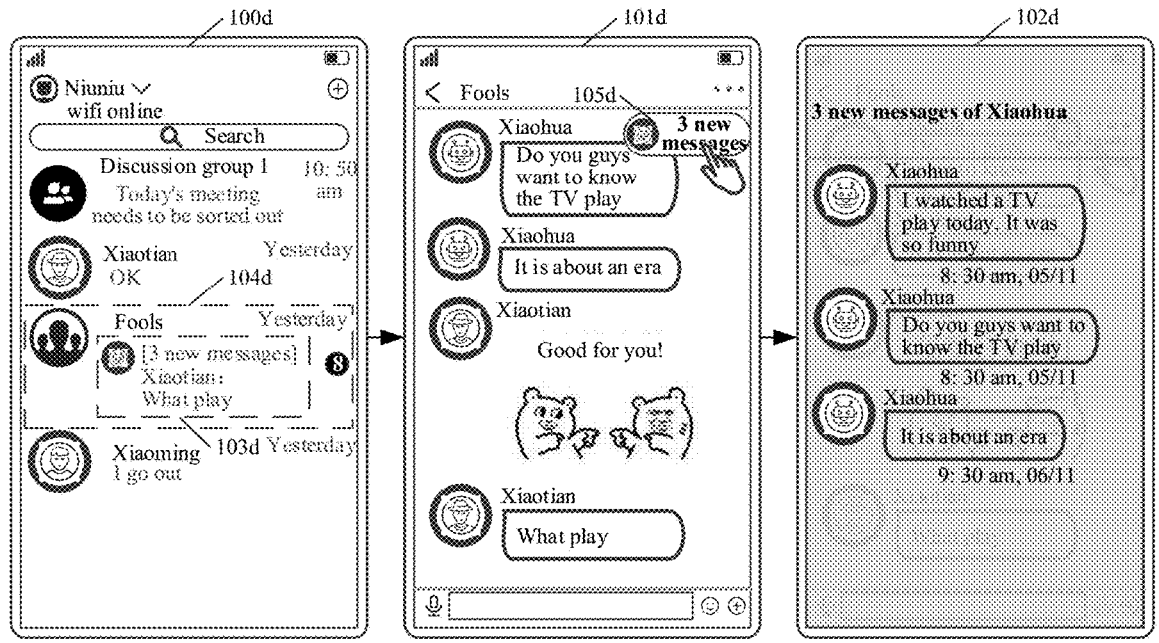
FIG. 5 is a schematic diagram of a message reading interface according to this application.

Referring to FIG. 5, FIG. 5 is a schematic diagram of a message reading interface according to this application. As shown in FIG. 5, interface 100d to interface 102d are interfaces on the social platform. Interface 100d includes a message prompt list on the social platform. The message prompt list includes a message prompt item 104d for the group named "Fools." When the social object "Xiaohua" is the followed social object and has three new messages (namely, three unread messages which are social messages), the message prompt item 104d can further include a new message prompt item 103d for the social object "Xiaohua." The new message prompt item 103d can include the object identifier of Xiaohua (which is the chat head of Xiaohua here) and prompt information "Three new messages" that indicates a quantity (three) of new messages of Xiaohua.

Thus, the message prompt item 104d in interface 100d is clicked, so that the object device can display interface 101d. Interface 101d is a group chat interface for the group "Fools." The group chat interface can be the aforementioned social interface. The social interface can contain group messages (namely, social messages) communicated between the several social objects (for example, several group members in the group "Fools").

Moreover, interface 101d can also display a prompt control 105d for the unread social messages for the followed social object (referring to Xiaohua here). The prompt control 105d can include the chat head of Xiaohua and the prompt information "Three new messages" that indicates the quantity of new messages.

Therefore, the prompt control 105d is clicked, so that the object device can display interface 102d, and the operation of clicking the prompt control 105d can be the preset operation performed on the target social object (which is Xiaohua here). Interface 102d aggregates and displays three new messages of Xiaohua. The three new messages are also three unread social messages of Xiaohua. The three new messages include a social message "I watched a TV play today. It was so funny," a social message "Do you guys want to know the TV play?," and a social message "It is about an era."

Figure 6:
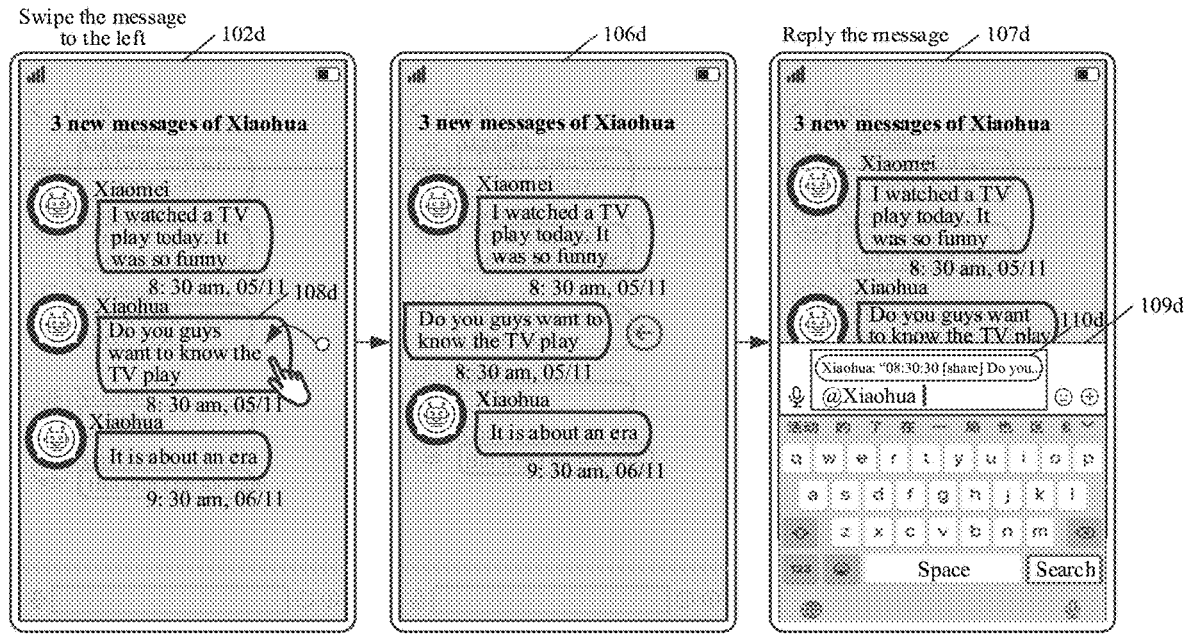
FIG. 6 is a schematic diagram of a message reply interface according to this application.

Referring to FIG. 6 together, FIG. 6 is a schematic diagram of a message reply interface according to this application. As shown in FIG. 6, interface 102d here is interface 102d shown in FIG. 5 above. In interface 102d, swiping a group message to the left can reply the swiped group message.

At this point, group message 108d of Xiaohua can be swiped to the left in interface 102d (that is, a left swiping operation performed on group message 108d, or another operation, such as right swiping or double click), and the object device can display interface 106d. Then, the hand of swiping group message 108d is released, and the object device can display interface 107d. Interface 107d contains a virtual keyboard 109d for replying group message 108d of Xiaohua. The virtual keyboard 109d contains reply prompt information 110d. The reply prompt information 110d is used for indicating that group message 108d of Xiaohua has been replied. Then, a group message (which can be referred to as a reply social message) can be entered in the virtual keyboard 109d to reply group message 108d. After the reply social message for replying group message 108d has been entered, the entered reply social message for replying group message 108d can be automatically displayed (namely, sent) in the social interface.

Figure 7A:
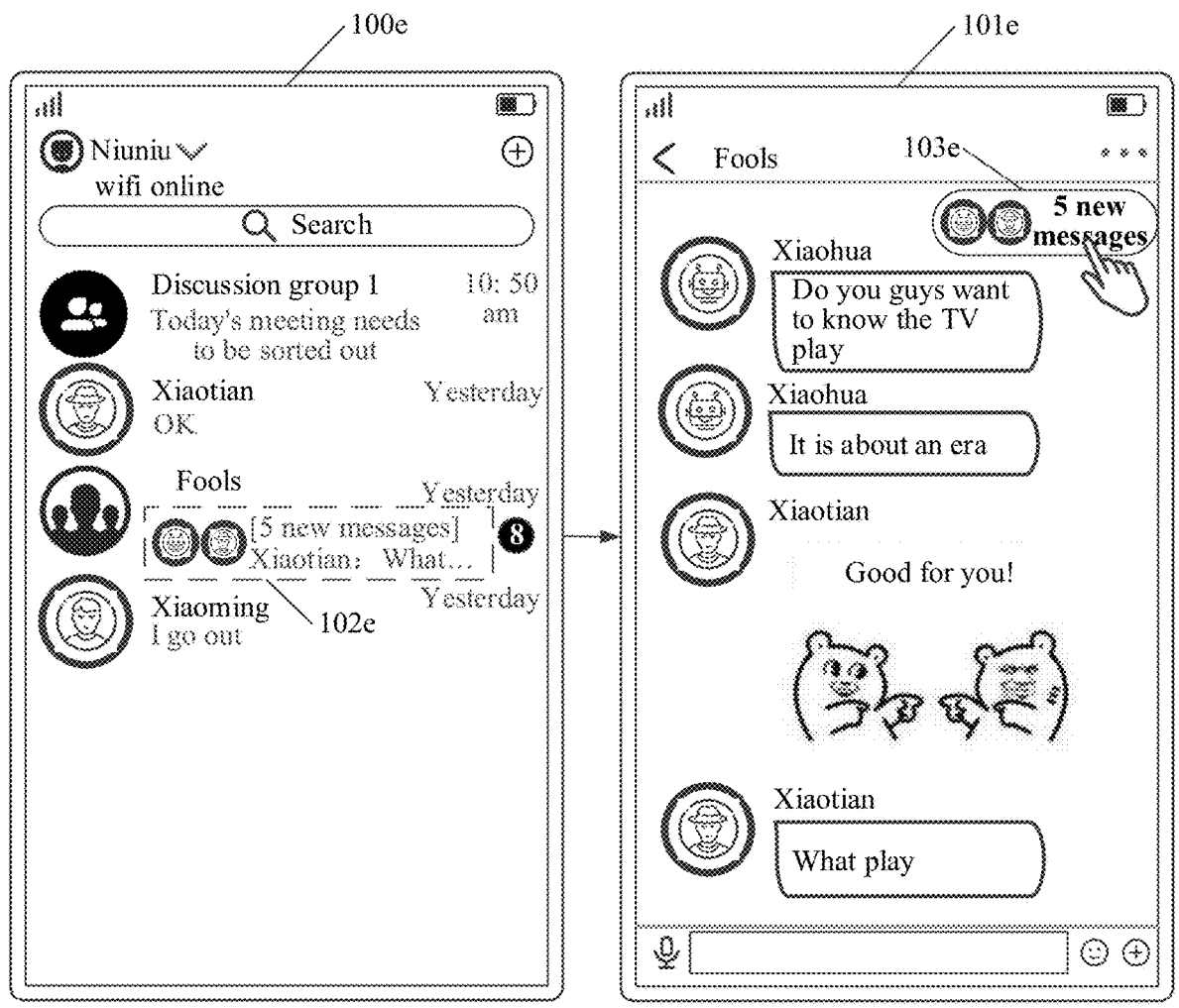
FIG. 7A to FIG. 7B are schematic diagrams of a message prompt interface according to this application.
Figure 7B:
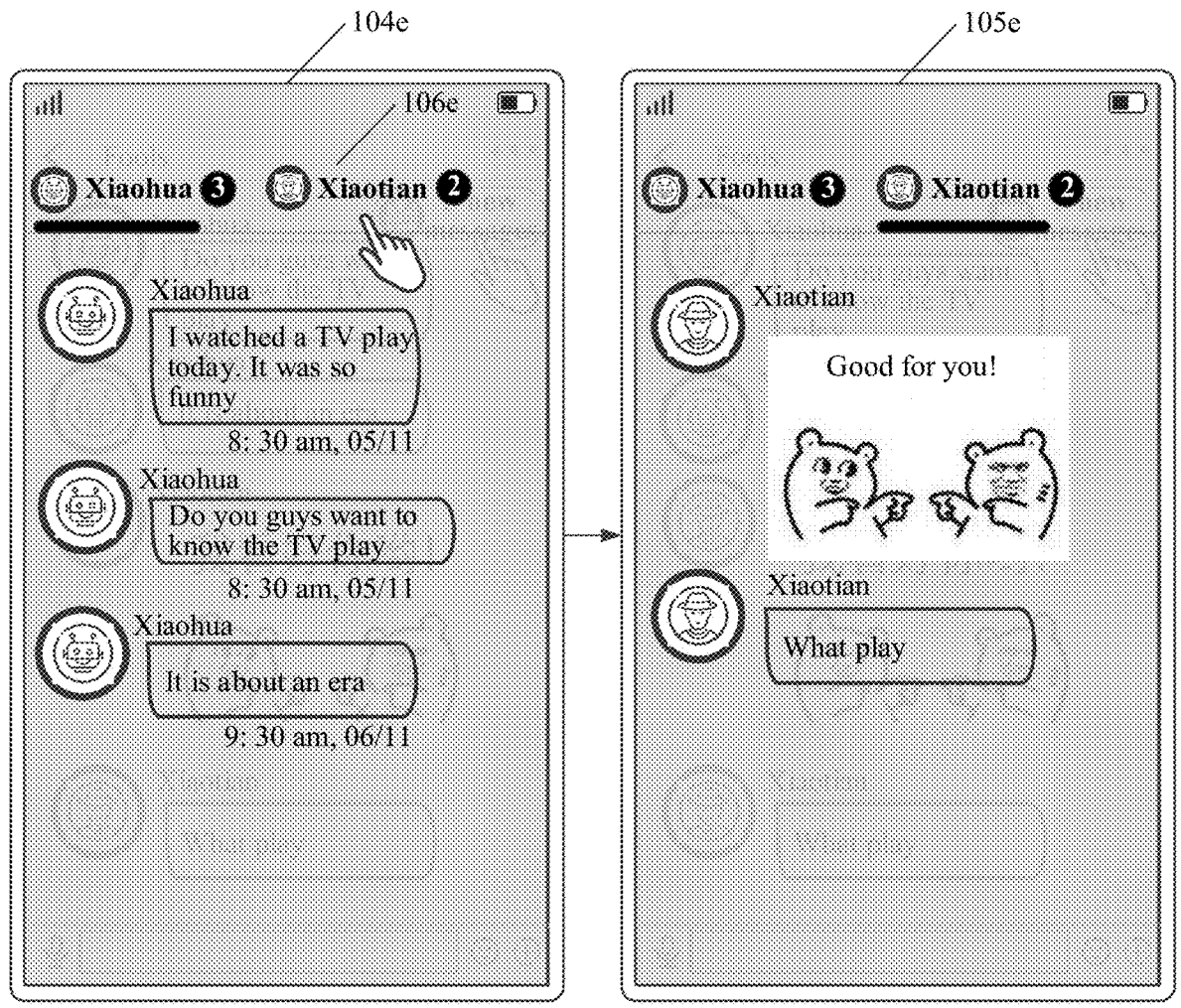

Referring to FIG. 7A to FIG. 7B, FIG. 7A to FIG. 7B are schematic diagrams of a message prompt interface according to this application. Similar to the principle described in FIG. above, when the target social object refers to a plurality of social objects having unread social messages among the L followed social objects, that is, when there are a plurality of target social objects, as shown in FIG. 7A, a message prompt item of the group "Fools" in message prompt interface 100e can include a new message prompt item 102e for the plurality of target social objects (including Xiaohua and Xiaotian here), and the new message prompt item 102e can include the chat heads of Xiaohua and Xiaotian and prompt information "Five new messages" including a total quantity of new messages of Xiaohua and Xiaotian.

Thus, the message prompt item of the group "Fools" can be clicked, and the object device can display interface 101e. Interface 101e may be the above social interface. Interface 101e also displays a prompt control 103e for Xiaohua and Xiaotian. The prompt control 103e can include the chat heads of Xiaohua and Xiaotian and the prompt information "Five new messages" including the total quantity of the new messages of Xiaohua and Xiaotian.

Therefore, when the above prompt control 103e is clicked, as shown in FIG. 7B, the object device can display interface 104e. Interface 104e classifies, aggregates and displays the new messages of Xiaohua and Xiaotian. In interface 104e, three new messages of Xiaohua (namely, three unread social messages of Xiaohua) are classified, aggregated and displayed, and two new messages of Xiaotian are hidden, aggregated and displayed. In interface 104e, a selection bar 106e of the new messages of Xiaotian can be clicked, and interface 105e is displayed. Interface 105e includes two new messages of Xiaotian (namely, two unread social messages of Xiaotian) that are classified, aggregated and displayed. The three unread social messages of Xiaohua can include a social message "I watched a TV play today. It was so funny," a social message "Do you guys want to know the TV play?," and a social message "It is about an era." The two unread social messages of Xiaotian can include a social message "a picture containing characters "Good for your!"" and a social message "What play."

The implementation principle of the above process can include the following: If a social message is a group message, the group message (which can be referred to as a message) returned by a backend device (for example, the backend device of the social platform) to a frontend (for example, the social platform in the object device) can be added with a like field and an unread field.

If the like field is 1, it indicates that it is a group message from a followed social object. Conversely, if the like field is 0, it indicates that it is not a group message from the followed social object.

Furthermore, if the unread field is 1, it indicates that it is an unread social message (namely, a message that has not been read by the user holding the object device), and if the unread field is 0, it indicates that it is a read social message (namely, a message that has been read by the user holding the object device).

Therefore, in the AIO (for example, when the social interface is displayed), the small ear (namely, the prompt control used for prompting the unread social messages of the followed social object) can preferentially display the quantity of messages: like=1 and unread=1. After the small ear is clicked, the corresponding messages will be positioned on the AIO. Afterwards, in the social interface, the small ear will display a quantity of remaining messages: like=1 and unread=1. After the small ear is clicked again, the corresponding messages will also be positioned on the AIO.

In one feasible implementation, in the process of displaying the social interface, a message typing status of a social object that is typing (namely, editing) a social message among the L followed social objects is displayed in the social interface. The message typing status can be a status in which the followed social object is entering a group message. The message typing status can be displayed through a text, a control, and other methods, such as by a bubble that indicates being entering a message.

In one possible implementation, if the social platform belongs to an instant messaging platform, the social interface belongs to a group chat interface of a group for message interaction on the instant messaging platform, and the social messages of the social objects belong to group messages of the social objects in the group, a message typing status of the followed social object that is currently entering a group message can also be displayed in the group chat interface.

Figure 8:
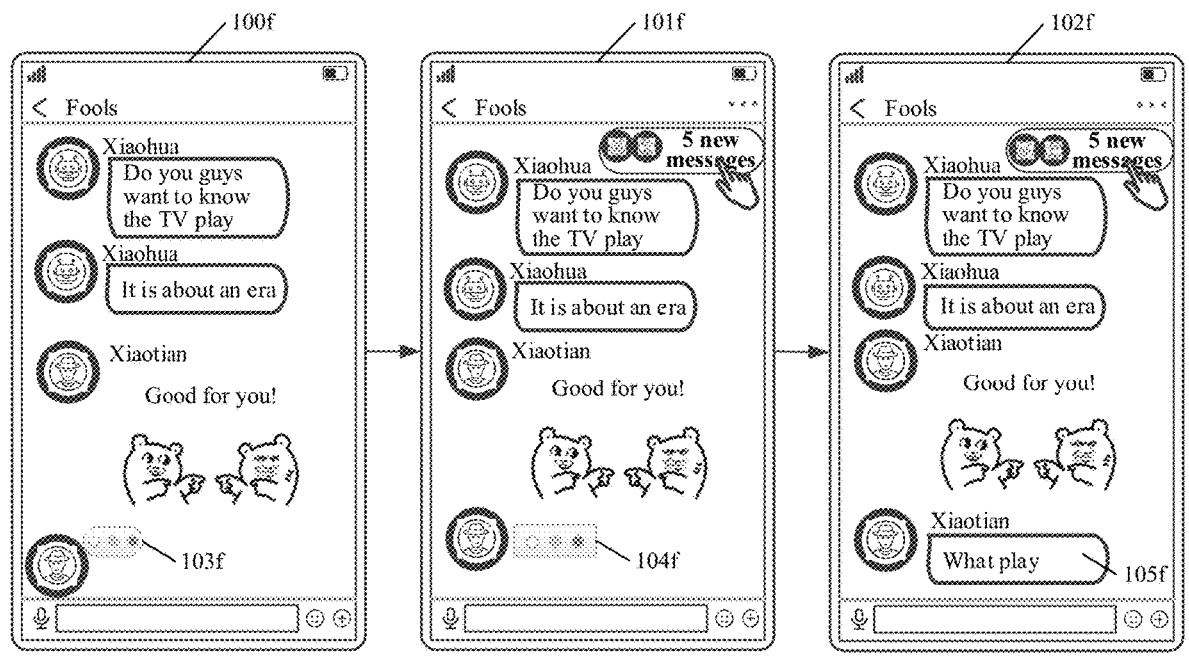
FIG. 8 is a schematic diagram of a message prompt interface according to this application.

Referring to FIG. 8, FIG. 8 is a schematic diagram of a message prompt interface according to this application. As shown in FIG. 8, interface 100f can be a social interface. If Xiaotian is a followed social object and is typing a message in the group "Fools" in real time, interface 100f can represent a message typing status (namely, a status of being typing a message) by displaying the chat head of Xiaotian and a bubble 103f associated with the chat head of Xiaotian.

Next, when the object device detects that Xiaotian has completed typing a message in the group "Fools," as shown in interface 101f, the object device can send the bubble 103f to the social interface (interface 101f here) through an animation and display a bubble 104f. Then, a new message 105f sent by Xiaotian can be continuously displayed in the displayed bubble 104f (as shown in interface 1020, thereby implementing a transitional process of sending a social message.

Figure 9:
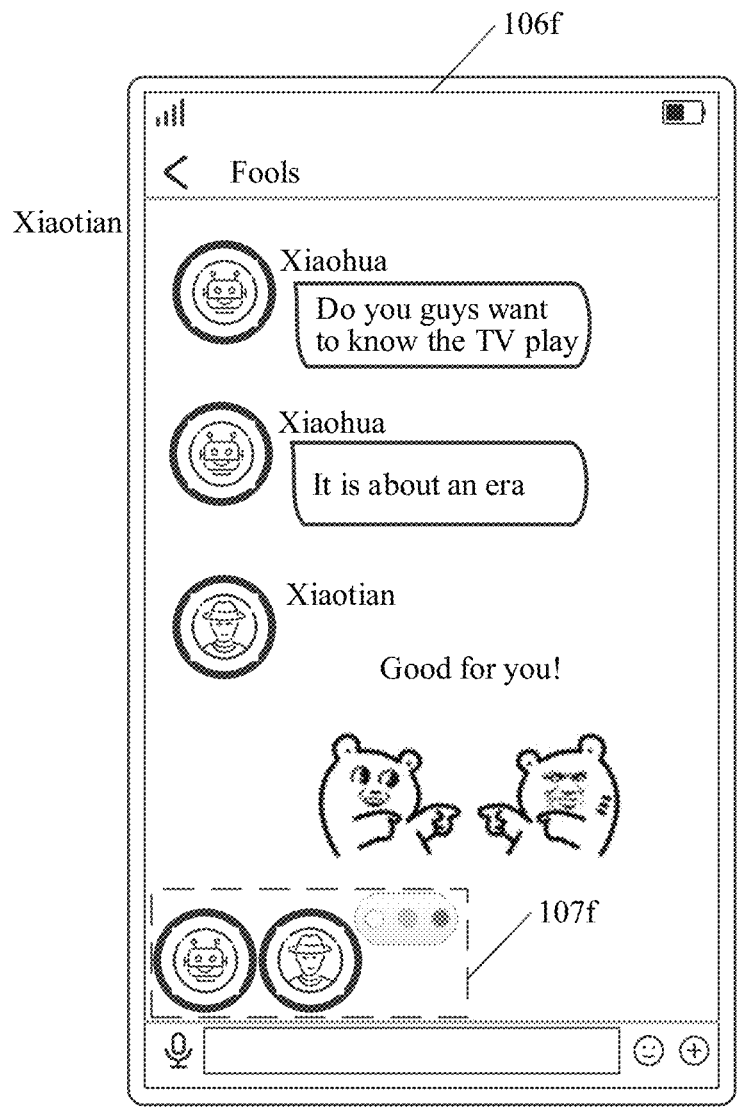
FIG. 9 is a schematic diagram of a message prompt interface according to this application.

Referring to FIG. 9 together, FIG. 9 is a schematic diagram of a message prompt interface according to this application. As shown in FIG. 9, if both Xiaohua and Xiaotian are followed social objects in the group "Fools," and both Xiaohua and Xiaotian are typing group messages in the group "Fools," message typing statuses (namely, a status of being typing a group message in the group) of Xiaohua and Xiaotian can also be displayed in real time on social interface 106f. The message typing statuses can be displayed through the chat heads of Xiaohua and Xiaotian in region 107f and an associated bubble.

The implementation principle of the above process can include the following: A frontend (for example, the social platform in the object device) polls an instant messaging (IM) read service module in a backend (for example, a backend device of the social platform). In addition to returning a message, the module in the backend also needs to return a status (namely, the message typing status, for example, the status of being typing a message) of a followed user (for example, the followed social object). Data ultimately returned by the IM module to the frontend is as follows: a message data type (such as picture, video, text, voice, and another message data type), and a status data type (that is, the message typing status of the followed user, such as the status of being typing).

A data structure of the status is defined as follows: user identifier (userId): this specifically refers to a user identifier of the followed social object; status: this means a user status: 0 represents an empty status; −1 represents being typing (the IM message will synchronize the user status when a user is editing in a SearchBar); and a positive number represents a quantity of unread messages (namely, unread social messages).

Finally, the frontend (for example, the social platform in the object device) can render and display a particularly followed user in the AIO on a user interface (UI) according to a status field, such as displaying the message typing status of the followed social object in the social interface.

In one possible implementation, there is a prerequisite to display the message typing status of the followed social object in the social interface. The prerequisite can be that the followed social object has granted a view permission for its own message typing status on the social platform, for example, authorizing the user holding the object device to view its message typing status. Under this prerequisite, the message typing status of the followed social object be displayed in the social interface. If this prerequisite is not satisfied, the message typing status of the followed social object will not be displayed in the social interface.

By the adoption of the method provided in this application, the social messages of the target social object can be quickly selected and viewed through a shortcut gesture in the social interface (such as the AIO) without leaving the AIO, which shortens a path of viewing the social messages of the target social object, efficiently helps the user view the social messages in a chat/content aggregation scenario, greatly improves the instant reach rate of the social messages, and improves the efficiency of viewing the social messages, thereby better prompting users' reading and understanding of the social messages. Moreover, the user can quickly learn about message prompts of a specific group and a specific group member on a current list page (such as a message list in the social interface), making information circulated faster.

This application can display a social interface; the social interface being used for displaying social messages of at least one social object; and receive a preset operation performed on a target social object among the at least one social object, and aggregate and display social messages transmitted by the target social object in the social interface. Therefore, the method provided in this application can directly perform a quick displaying operation (for example, the preset operation) on the social messages of the target social object in the social interface, and quickly aggregate and display the social messages of the target social object in response to the preset operation, which improves the efficiency of displaying the social messages of the target social object and enriches the method for triggering and displaying the social messages of the target social object.

Figure 10:
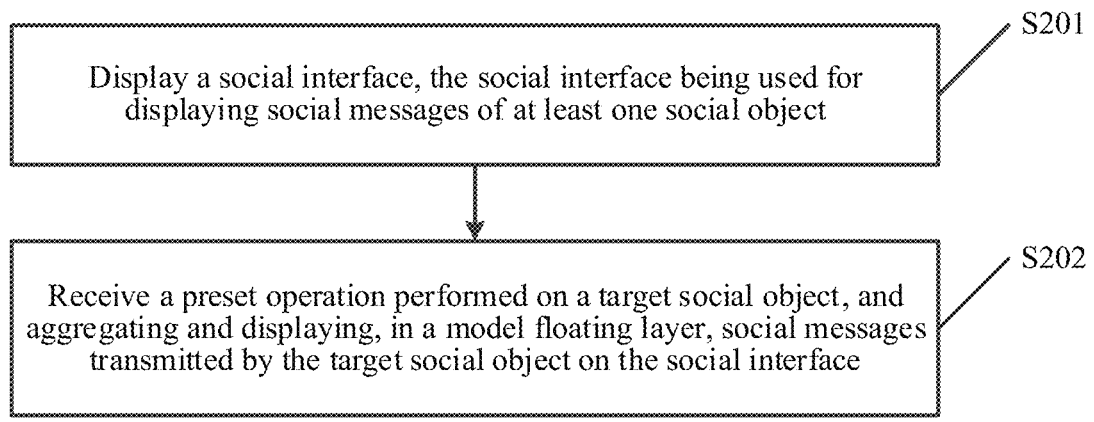
FIG. 10 is a flowchart of an interaction data processing method according to this application.

Referring to FIG. 10, FIG. 10 is a flowchart of an interaction data processing method according to this application. As shown in FIG. 10, the method includes the following steps:

S201: displaying a social interface, the social interface being used for displaying social messages of at least one social object.

An executive body in the embodiments of this application may be the same as the executive body in the embodiments corresponding to FIG. 3 above, for example, the object device. A specific process of displaying the social interface by the object device may refer to S101 in the embodiments corresponding to FIG. 3 above.

S202: receiving a preset operation of a target social object, and aggregating and displaying, in a model floating layer, social messages transmitted by the target social object in the social interface.

In one possible implementation, the object device may receive the preset operation performed on the target social object in the social interface, and aggregate and display, in the model floating layer, the social messages transmitted by the target social object in the social interface.

The model floating layer is a floating layer independently displayed in the social interface. The model floating layer can also be referred to as a model pop-up window. Model in the model floating layer indicates that floating layers can interact. The model floating layer can interact, which refers to triggering corresponding user operations in the model floating layer and respond to the triggered user operations in the model floating layer.

It can be understood that in the process of displaying the model floating layer, the social interface is displayed all the time, and it is just covered by the model floating layer. In other words, the model floating layer covers the social interface.

In one possible implementation, a quick reply can be made to the social messages of the target social object in the model floating layer. This process can be as follows: The object device can receive a reply operation performed on the social messages in the model floating layer and output a virtual keyboard for replying the operated social messages. Then, the object device can receive a reply social message entered via the virtual keyboard. After receiving the reply social message, the object device can close the model floating layer and can display (namely, send) the received reply social message in the displayed social interface. The reply social message is a social message used for replying the operated social message.

In one possible implementation, the virtual keyboard can contain the operated (namely, referenced) social message. The operated social message can refer to a social message operated (or indicated) by the reply operation. For example, the left swiping operation performed on message 108*d* in FIG. 6 above can be the reply operation, and the operated social message can be message 108*d*.

The social message operated by the reply operation can be any social message of the target social object displayed in the model floating layer. In one possible implementation, the reply operation performed on the social message can be a left swiping operation performed on the social message in the model floating layer.

According to the above methods, it is possible to quickly reply the operated social message in the model floating layer, which improves the reply efficiency.

In one possible implementation, it also supports selecting a social message of the target social object in the model floating layer, and then performing corresponding service processing on the selected social message (for example, forwarding or deleting the social message). The process can be as follows:

The object device can receive a selection operation performed on the social messages of the social objects in the model floating layer and output a processing control used for processing an operated social message. The operated social message here can refer to a social message selected by the selection operation. Thus, the object device can process the operated (namely, selected) social message in the model floating layer according to a triggering operation performed on the processing control and a processing manner indicated by the processing control.

The selection operation performed on the social messages of the target social object in the model floating layer can be various types of operations, such as a right swiping operation performed on the social messages of the target social object. In one possible implementation, in this process, the selection operation performed on the selected first social message of the target social object in the model floating layer can be the right swiping operation performed on the first social message. After the first social message is selected, a selection control can be displayed next to (such as at a position close to the front of the social message) each social message in the model floating layer. If more social messages besides the first social message mentioned above need to be selected, selection operations performed on the respective social messages can be performed through the selection controls of the respective social messages, that is, more social messages are selected through the selection controls of the respective social messages. The triggering operation performed on the processing control can be various types of operations, such as a clicking operation, which are not limited in the embodiments of this application.

In one possible implementation, the processing control can be a forwarding control, a deletion control, or the like.

If the processing control is a forwarding control, the processing manner indicated by the processing control can be forwarding the operated social message. Therefore, when the object device detects a triggering operation performed on the processing control, the object device can display a forwarding interface for the operated social message. Further, in the forwarding interface, an object to which the operated social message needs to be forwarded (this object can be any object on the social platform, but is not limited to an object among the at least one social object mentioned above).

If the processing control is a deletion control, the processing manner indicated by the processing control can be deleting the operated social message. Therefore, when the object device detects a deletion operation performed on the processing control, the object device can delete the operated social message from the model floating layer or/and from the social interface. In one possible implementation, the object device can also automatically close the model floating layer at this time. After the model floating layer is closed, the social interface will appear (namely, the social interface is not covered by the model floating layer), and the displayed social interface can exclude the above social message deleted from the model floating layer.

Figure 11A:
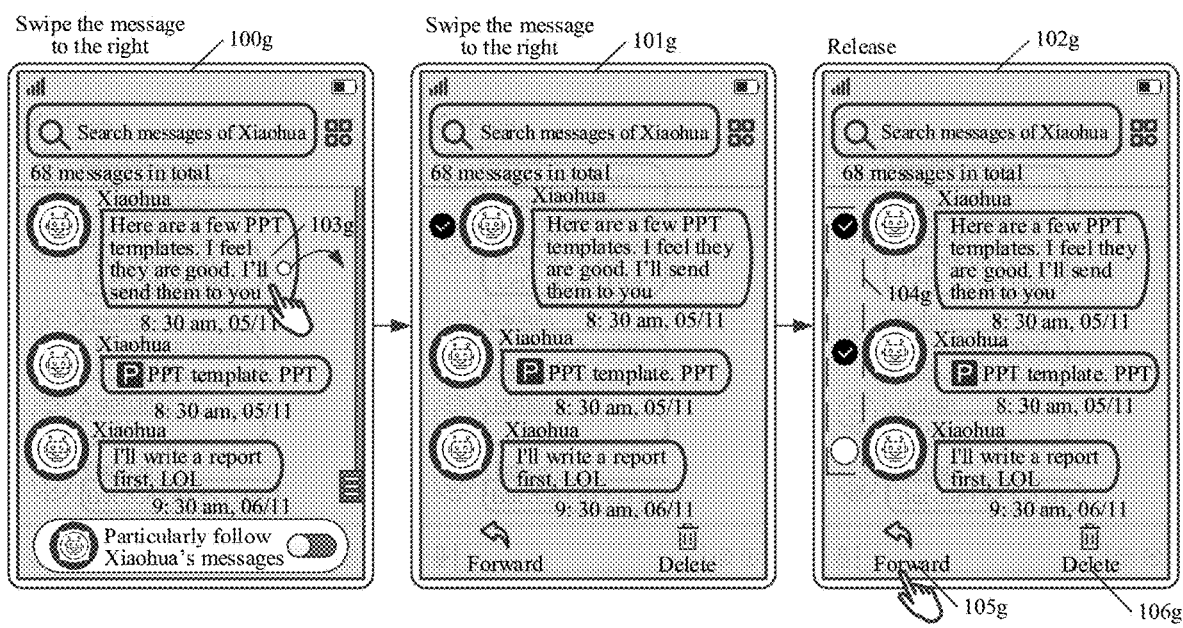
FIG. 11A to FIG. 11B are schematic diagrams of a message processing interface according to this application.
Figure 11B:
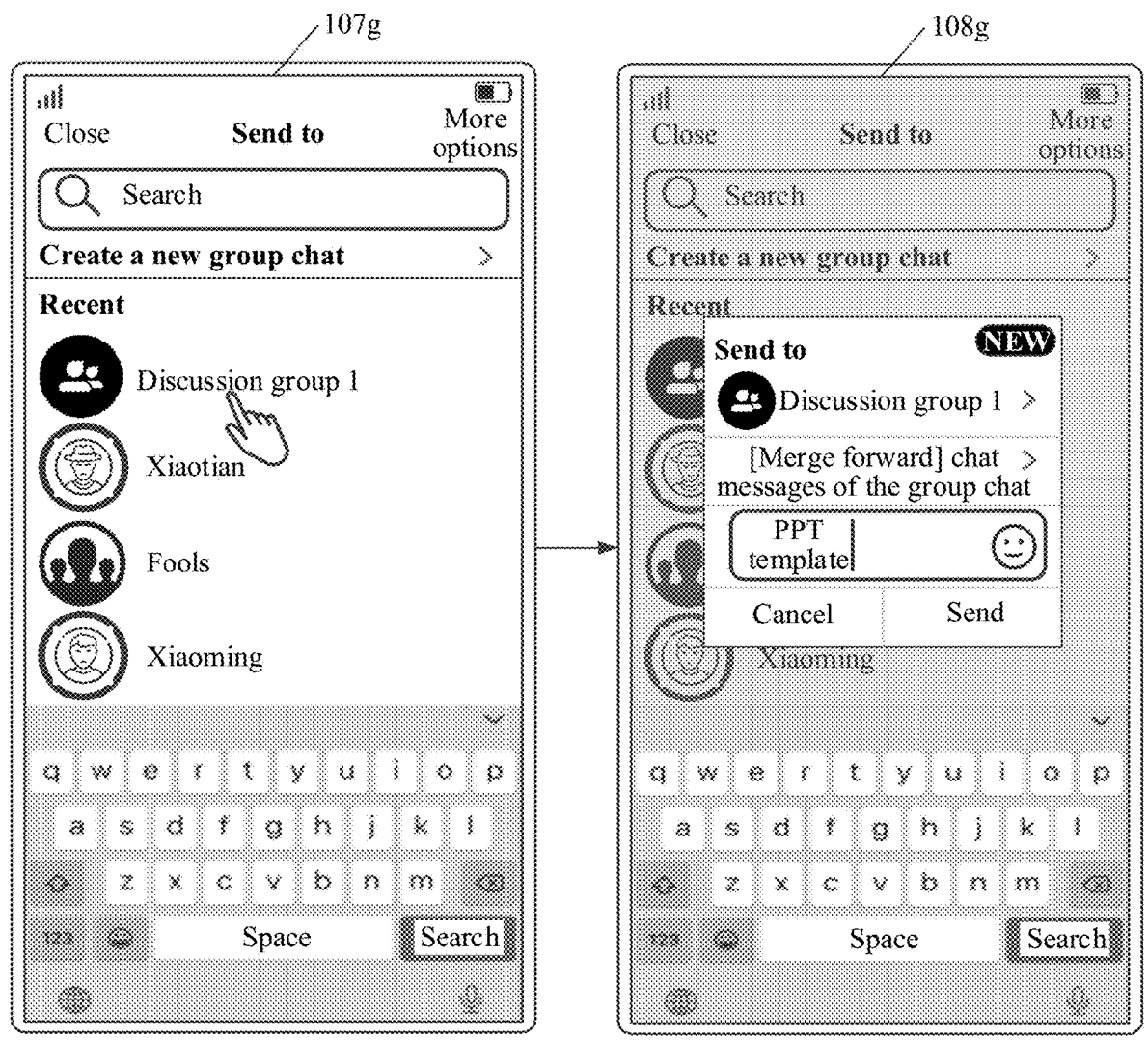

Referring to FIG. 11A to FIG. 11B, FIG. 11A to FIG. 11B are schematic diagrams of a message processing interface according to this application. As shown in FIG. 11A, interface 100*g* is the interface of the model floating layer. Interface 100*g* displays social messages (namely, group messages) of Xiaohua, and the group messages in interface 100*g* can be selected. By performing a right swiping operation on group message 103*g* of Xiaohua in interface 100*g*, the object device can display interface 101*g* and then interface 102*g*. Interface 102*g* includes selection controls (as shown in bar 104g) displayed in front of the respective group messages of Xiaohua, and then, the group messages can be selected through the selection controls in front of the respective group messages. The first two group messages of Xiaohua in interface 102g are selected.

Furthermore, interface 102g also includes a processing control 105g for forwarding and a processing control 106g for deletion. The processing control 105g can be clicked, as shown in FIG. 11B, and the object device can display interface 107g. Interface 107g is an interface used for selecting an object to which the operated (namely, selected) group messages of Xiaohua are forwarded. Discussion group 1 is selected, to which the group messages of Xiahua selected in interface 102g are forwarded, and is displayed in interface 108g.

Interface 108g includes a pop-up window 109g for forwarding. A relevant description of the message forwarding is typed in the pop-up window 109g. The object device can collectively send the typed relevant explanation and the selected group messages of Xiaohua to Discussion group 1.

From the above descriptions, it can be seen that this application can bind a left swiping gesture event A and a right swiping gesture event B to a message item component (used for displaying social messages (such as group messages), where one message item component corresponds to one social message) in the model floating layer.

The left swiping gesture event A can include: pulling up a keyboard (such as the virtual keyboard) in the model floating layer and triggering a logic of message reference and reply. Binding the left swiping gesture event A to the message item component can support performing left swiping on and then replying a group message in the model floating layer.

The right swiping gesture event B can include: performing right swiping on a group message in a view (for example, the model floating layer), so that the model floating layer enters a multi-selection status. In the multi-selection status, a forward button and a delete button are added on the bottom, and corresponding events are bound. A detection bar style of being checked needs to be displayed on the left side of the message item component on which event A is triggered. A component on the top is replaced by a title component. By using the title component, a quantity of the selected message item component (namely, a quantity of the selected social message) is displayed.

The above described left swiping gesture event A and the right swiping gesture B are merely an example. In other examples, the left swiping gesture event A and the right swiping gesture event B may be swapped, i.e., the left swiping gesture event A can include performing left swiping on a group message in a view so that the model floating layer enters the multi-selection status and the right swiping gesture event B can include pulling up the keyboard.

In one possible implementation, the model floating layer can also include a slider control. The object device can also include a device interface. In this case, the object device can also receive a swiping operation performed on the slider control, swipe and display the social messages in the model floating layer, and display message sending time of the social messages in the device interface in the slider control.

The model floating layer can also include a sliding axis (which can be in a vertical direction and can be a time axis). The slider control can be swiped on the sliding axis (for example, up and down). With the swiping operation performed on the slider control, the social messages displayed in the model floating layer can also be swiped and displayed.

The social messages displayed in the model floating layer are swiped and displayed, which can refer to: scrolling and displaying the social messages in the model floating layer. Specifically, the social messages in the model floating layer can be displayed in sequence according to an order of their respective message sending time. Social messages with earlier message sending time can be displayed at an upper position of the model floating layer. Social messages with later message sending time can be displayed at a lower position of the model floating layer. Positions of the sliding axis from top to bottom also indicate an order of the message sending time from early to late. Therefore, in the process of swiping the slider control on the sliding axis, several social messages in the model floating layer can be scrolled up and down and displayed, that is, the social messages, displayed on the device interface, in the model floating layer are changeable, so as to scroll and display the social messages sent by the slider control at the corresponding message sending time at the corresponding positions on the sliding axis.

Moreover, with the swiping operation performed on the slider control, the slider control can also display sending time (which can be referred to as the message sending time) of the social messages swiped and displayed in the model floating layer. According to different swiping operations, displaying of the social messages and displaying of the corresponding sending time may also vary. For details, please refer to the following content description.

For example, the above swiping operation performed on the slider control can also include a first swiping operation. The slider control can be swiped up and down in the model floating layer. An operation that swipes the slider control downwards can be referred to as the first swiping operation. Swiping the slider control downwards indicates that a user wants to view social messages sent before the social messages displayed on the current device interface are sent. Social messages that are sent earlier will be displayed at an upper position in the model floating layer. Therefore, the object device can swipe and display the social messages in the model floating layer according to the first swiping operation performed on the slider control, and can display, in the slider control, the social message located on the bottom of the device interface (in one possible implementation, a social message can be completely displayed on the top of the device interface). By continuously performing the swiping operation on the slider control, different social messages can be swiped and displayed in the device interface, and the message sending time displayed in the slider control can also be continuously updated and changed.

For example, the above swiping operation performed on the slider control can also include a second swiping operation. An operation that swipes the slider control upwards can be referred to as the second swiping operation. Swiping the slider control upwards indicates that a user wants to view social messages sent after the social messages displayed on the current device interface are sent. Social messages that are sent later will be displayed at a lower position in the model floating layer. Therefore, the object device can swipe and display the social messages in the model floating layer according to the second swiping operation performed on the slider control, and can display, in the slider control, the message sending time of the social message located on the top of the device interface (in one possible implementation, a social message can be completely displayed at the bottom of the device interface). By continuously performing the swiping operation on the slider control, different social messages can be swiped and displayed in the device interface, and the message sending time displayed in the slider control can also be continuously updated and changed.

Due to the slider control that can display the message sending time, the social messages displayed in the model floating layer can be quickly positioned. For example, a social message sent by the target social object at a certain time point can be quickly positioned.

Figure 12A:
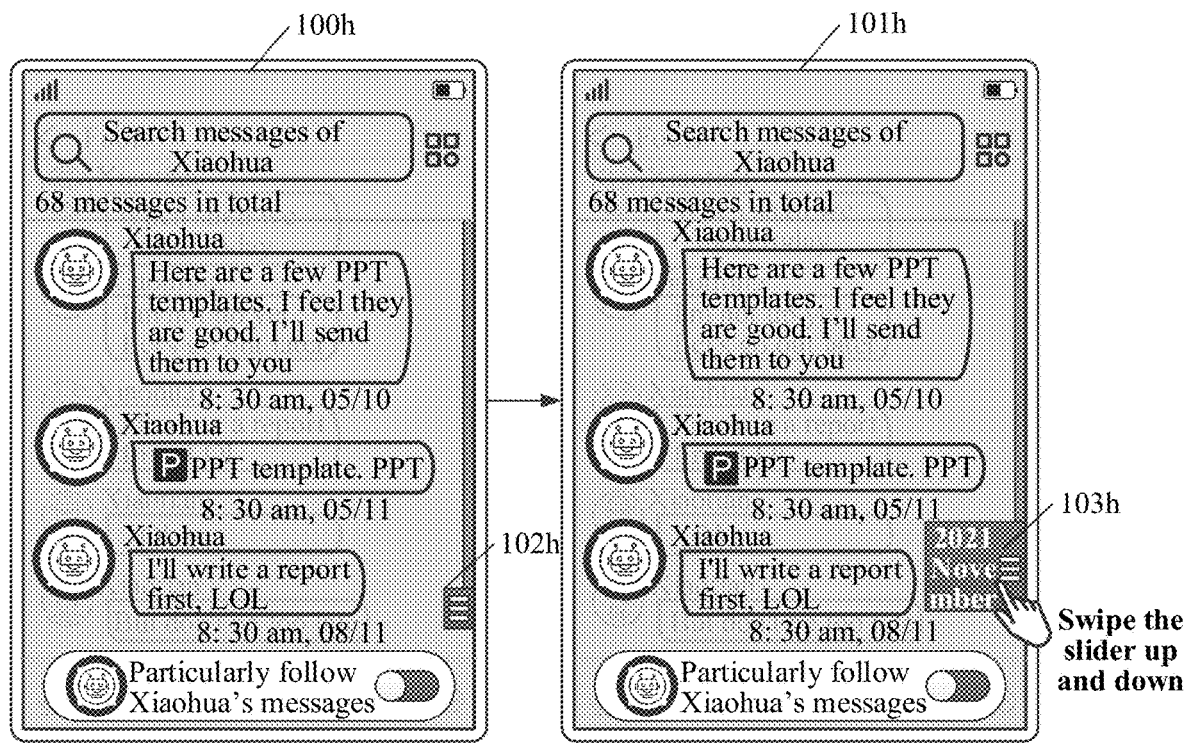
FIG. 12A to FIG. 12B are schematic diagrams of a scenario of viewing messages according to this application.
Figure 12B:
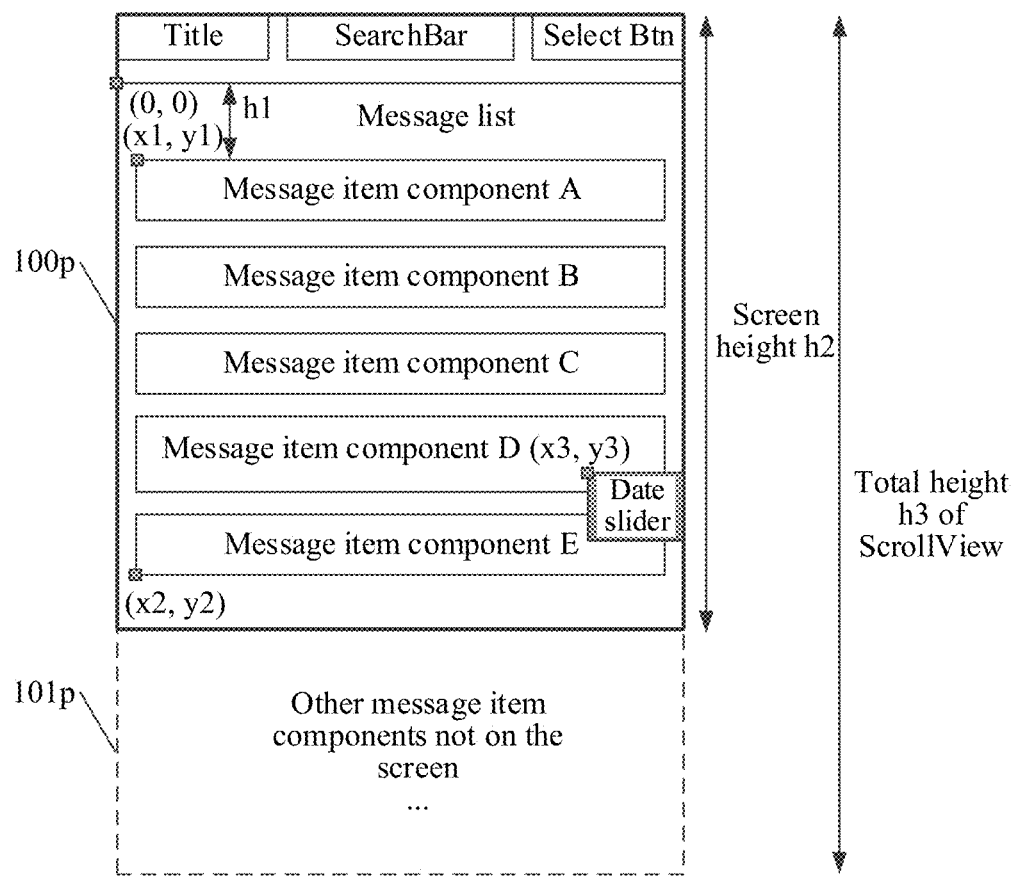

Referring to FIG. 12A to FIG. 12B, FIG. 12A to FIG. 12B are schematic diagrams of a scenario of viewing messages according to this application. As shown in FIG. 12A, interface 100*h* is the interface of the model floating layer used for aggregating and displaying the social messages of the target social object (referred to as Xiaohua here), and interface 100*h* also includes a slider control 102*h* (which is currently in a stationary status). As shown in interface 101*h*, the slider control 102*h* can be swiped up and down. In the swiping process, the slider control 102*h* can display the message sending time of the swiped and displayed social messages (such as sending time of the group messages).

If the slider control is swiped upwards, the message sending time displayed in the slider control can be the message sending time, i.e. "November 2021," of a group message "I'll write a report first, LOL" displayed at the bottom of interface 101*h* (refer to 103*h* in FIG. 12A).

If the time slider control is swiped downwards, the message sending time displayed in the slider control can be the message sending time, i.e. "October 2021," of a group message "Here are a few PPT templates. I feel they are good. I'll send them to you" displayed on the top of interface 101*h*.

Furthermore, the social messages are the group messages of the social objects, and a structure of a model floating layer 100*p* can be as shown in FIG. 12B. The model floating layer 100*p* can include a title component (which can be switched according to a status of the model floating layer), a SearchBar component (which is, for example, used for typing a search content), a select button Btn (which is, for example, a button for displaying a content type list), and a message list. The message list can include several message item components, one of which is used for displaying one social message of a social object.

It can be understood that due to the fact that the model floating layer 100*p* can include several message item components and the message item components may not be displayed simultaneously on the device interface of the object device, some message item components (message item component A to message item component E) in the model floating layer may be displayed on the object interface, and some message item components (for example, "other message item components not on the screen . . . " in region 101*p* of FIG. 12B) may be hidden and displayed under the device interface.

A height of the screen of the object device can be h2. An offset of ScrollView can be h1. Coordinates of an upper left corner of message item component A can be (x1, y1). Coordinates of a lower left corner of last message item component E on the screen can be (x2, y2). A total height of ScrollView of the message list can be h3. A date slider here is the slider control. Coordinates of an upper left corner of the date slider are (x3, y3). Coordinates of each component in the message list can be based on the upper left corner of the message list that is used as an origin. Down coordinates of a left edge (which can be understood as a left edge of the screen) displayed in the message list on the screen are positive, and up coordinates of the left edge displayed in the message list are negative. A straight line where the left edge is located can be understood as a vertical axis used for representing y-coordinates. Right coordinates of an upper edge displayed in the message list are positive, while left coordinates of the upper edge displayed in the message list are negative. A straight line where the upper edge is located can be understood as a horizontal axis used for representing x-coordinates.

Therefore, in the process of scrolling and displaying the social messages in the model floating layer by swiping the date slider, a formula is usually satisfied: y3:h2=h1:h3, so that in the process of scrolling and displaying the social messages by swiping the date slider, the social messages in the model floating layer can be scrolled and displayed according to a corresponding swiping ratio based on a swiping ratio of the date slider. Event D can also be added to the date slider. Event D can include: When the gesture of dragging the date slider triggers callback, the latest Y3 of the date slider is obtained. According to the formula "y3:h2=h1: h3," the latest offset h1 of ScrollView can be calculated. During the operation of scrolling a setting panel of the component of the message list to position h1, the content (for example, the displayed message sending time) of the date slider itself can be correspondingly updated according to event C.

As shown in FIG. 12B, event C can include: When the date slider is downwards swiped (namely, according to the downward swiping operation performed on the slider control), the coordinates of the upper left corner of each message item component in the model floating layer are detected, and sending time (namely, the message sending time) of a social message corresponding to a message item component (for example, message item component A) with a y-coordinate (for example, y1) that is greater than 0 and the smallest is used as sending time that the date slider needs to display.

Event C can further includes: When the date slider is upwards swiped (namely, according to the upward swiping operation performed on the time slider control), the coordinates of the upper left corner of each message item component in the model floating layer are detected, and sending time (namely, the message sending time) of a social message corresponding to a message item component (for example, message item component E) with a y-coordinate (for example, y2) that is displayed on the screen and the largest is used as sending time that the date slider needs to display.

In one possible implementation, the social messages in the model floating layer can also be quickly positioned and displayed in the social interface. This process can be as follows: The object device can close the model floating layer according to a positioning operation performed on the social messages in the model floating layer, position a display position of the operated social message in the displayed social interface, and highlight the operated social message at the display position. The operated social message can be a social message operated by the positioning operation. In one possible implementation, the positioning operation performed on the social messages can be a clicking operation performed on the social messages in the model floating layer. Highlighting can include changing a font color, adding a specific mark, and the like, which is not limited in the embodiments of this application here.

The positioning of the display position of the operated social message in the social interface can refer to the following: Due to the fact that the several social messages displayed in the model floating layer can also be displayed in the order of their respective message sending time, social messages with earlier message sending time are displayed at an upper position of the model floating layer. Conversely, social messages with later message sending time are displayed at a lower position of the model floating layer. Therefore, the positioning of the display position of the operated social message can refer to exposing and displaying the operated social message in the model floating layer (usually also exposing and displaying social messages sent within time before and after the operated social message is sent) on the device interface of the object device.

Figure 13:
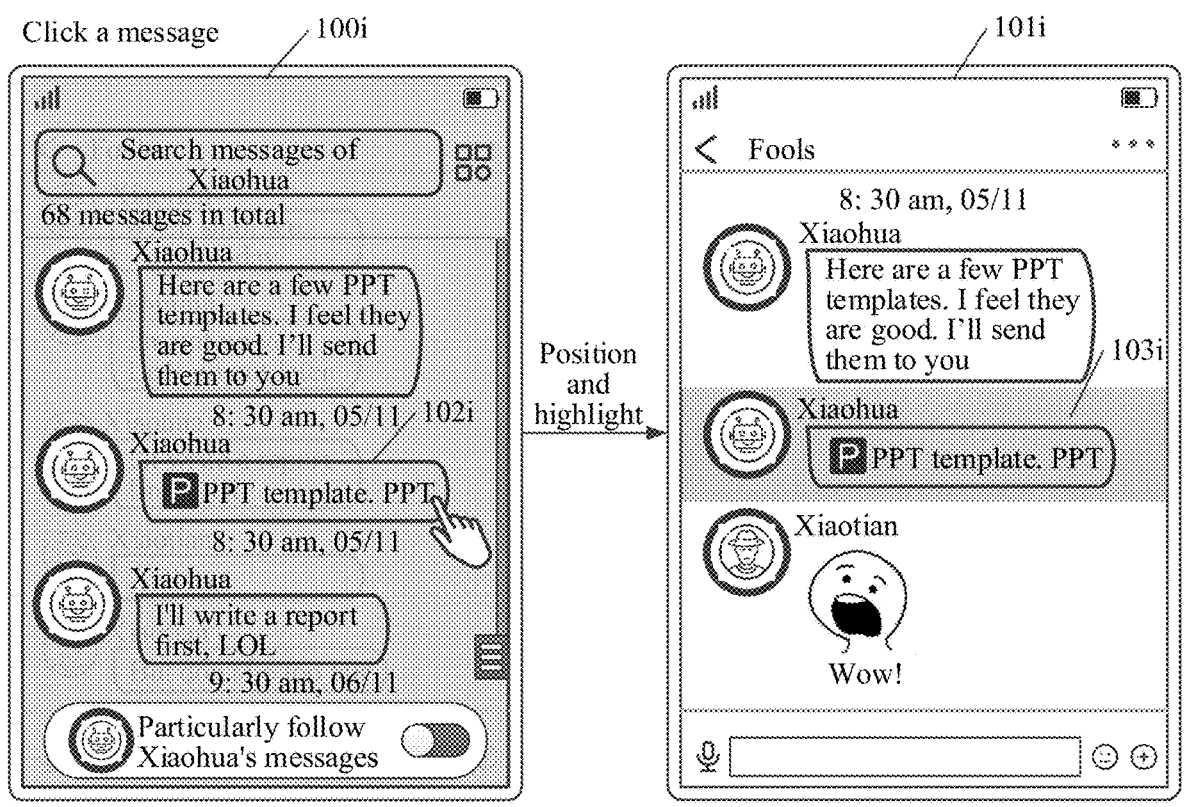
FIG. 13 is a schematic diagram of a message positioning and displaying interface according to this application.

Referring to FIG. 13, FIG. 13 is a schematic diagram of a message positioning and displaying interface according to this application. As shown in FIG. 13, interface 100*i* is the interface of the model floating layer. Interface 100*i* displays the social messages of the target social object (referring to member "Xiaohua" in the group "Fools"). When group message 102*i* of Xiaohua in interface 100*i* is clicked, the object device can close the model floating layer and display interface 101*i*. Interface 101*i* belongs to a social interface. Interface 101*i* positions and displays the position of clicked group message 102*i* and highlights a message bar 103*i* of group message 102*i*.

The above process can be achieved by binding event E to a message item component in the model floating layer. Event E can include the following: obtaining a message identifier (message id) field of a currently clicked message item component in the model floating layer, closing a shortcut view, and sending the message id to an AIO component. The AIO indexes a scroll bar in the social interface to the corresponding position according to the message id and highlights a message to which the message id belongs.

In one possible implementation, the social messages of the target social object can be searched (namely, filtered) in the model floating layer. This process can be as follows: The object device can obtain a search content entered in the model floating layer, and then the object device can select and display, in the model floating layer, a social message that is sent by the target social object and contains the search content. In some possible implementations, the search content can be a keyword, a character, or a picture that needs to be searched.

In one possible implementation, if the search content is a picture, the object device can select and display, in the model floating layer, a social message that is sent by the target social object and contains a picture with a picture similarity to this picture reaching a similarity threshold. A picture similarity between two pictures can be obtained through a picture processing model (which can be pre-trained).

Figure 14:
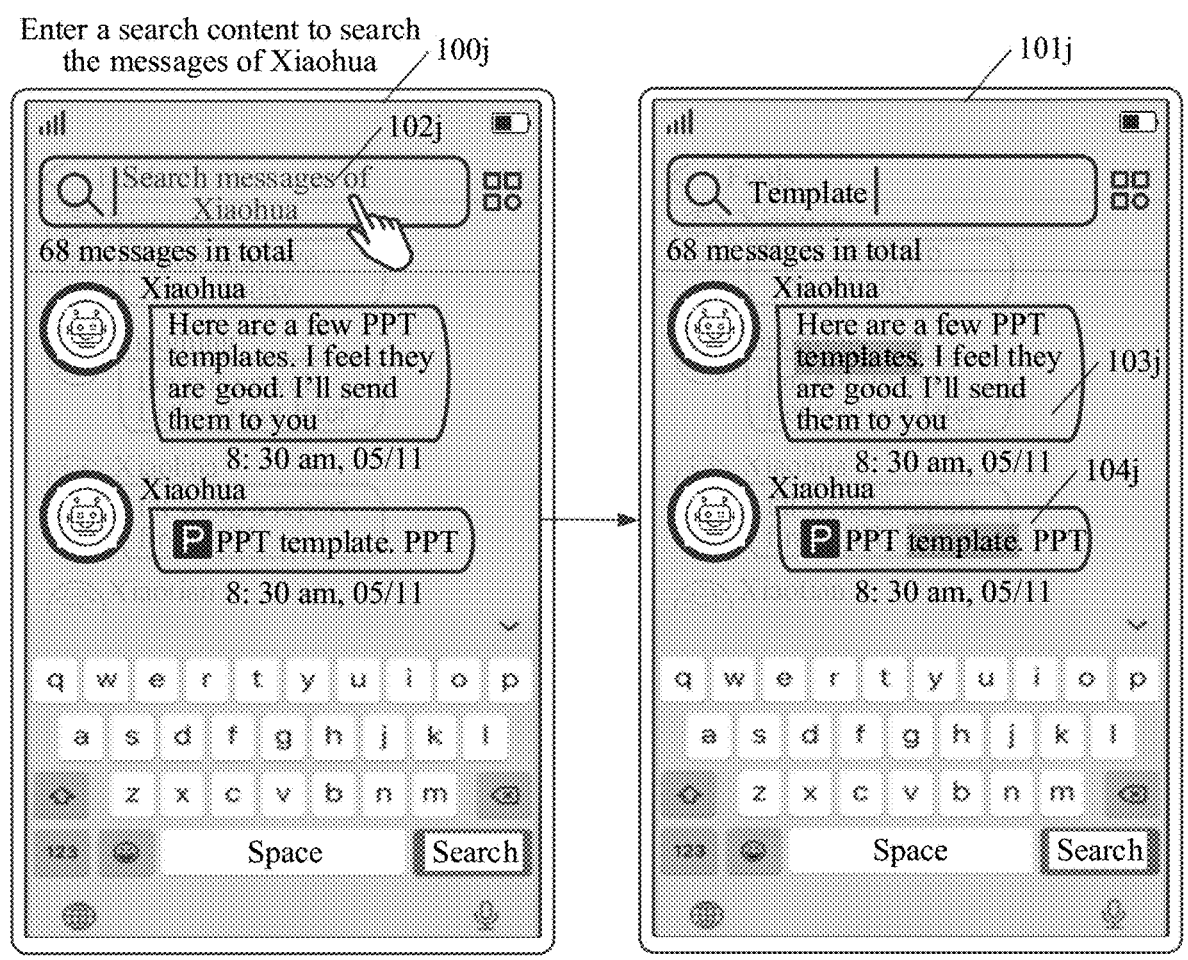
FIG. 14 is a schematic diagram of a message search interface according to this application.

Referring to FIG. 14, FIG. 14 is a schematic diagram of a message search interface according to this application. As shown in FIG. 14, interface 100*j* is the interface of the model floating layer. Interface 100*j* includes a search control 102*j*, and a search content can be entered in the search control 102*j* to search a specific message (such as a group message that contains the search content) of Xiaohua in the model floating layer. If the entered search content is "template," interface 101*j* can be displayed after searching. Interface 101*j* selects and displays a group message 103*j* that contains the search content "template" and is sent by Xiaohua and a group message 104*j* that contains the search content "template" and is sent by Xiaohua.

In one possible implementation, the social messages of the target social object can be classified and searched in the model floating layer. This process can be as follows: displaying a message type list in the model floating layer, the message type list containing message types of the social messages; then receiving a selection operation performed on a target message type in the message type list; and selecting and displaying, in the model floating layer, a social message transmitted by the target social object and belonging to the target message type.

The message type list is displayed in the model floating layer, which can be achieved on the basis of a triggering operation performed on a certain social object. The triggering operation can be various types of operations. In one possible implementation, the model floating layer can include a classification search control. In this case, the triggering operation can be a triggering operation performed by a social object on the classification search control. The triggering operation may be a clicking operation or the like. In addition, the message type list can include the message types of the social messages. The message types of the social messages can include a picture type, a video type, a file type, a link type, an expression type, an audio type, and the like.

The target message type can be any message type selected in the message type list through the selection operation, such as a picture type.

The above process can be achieved by filtering the selected social messages of the target social object in the model floating layer using a type or content field once again. The type field is used for classifying and searching the social messages of the target social object in the model floating layer, and the selected type field is the selected message type. The content field is used for filtering the social messages of the target social object in the model floating layer according to the search content, and the set content field is the entered search content.

In one possible implementation, if the target social object is not a followed social object, the object device can also display a follow control for the target social object in the model floating layer, and the follow control is used for prompting that the target social object can be set as a followed social object. Therefore, the object device can receive a triggering operation performed on the follow control (if the follow control can be a follow switch control, the triggering operation can be a switch-on operation performed on the follow control), and the target social object is set as a followed social object.

Figure 15A:
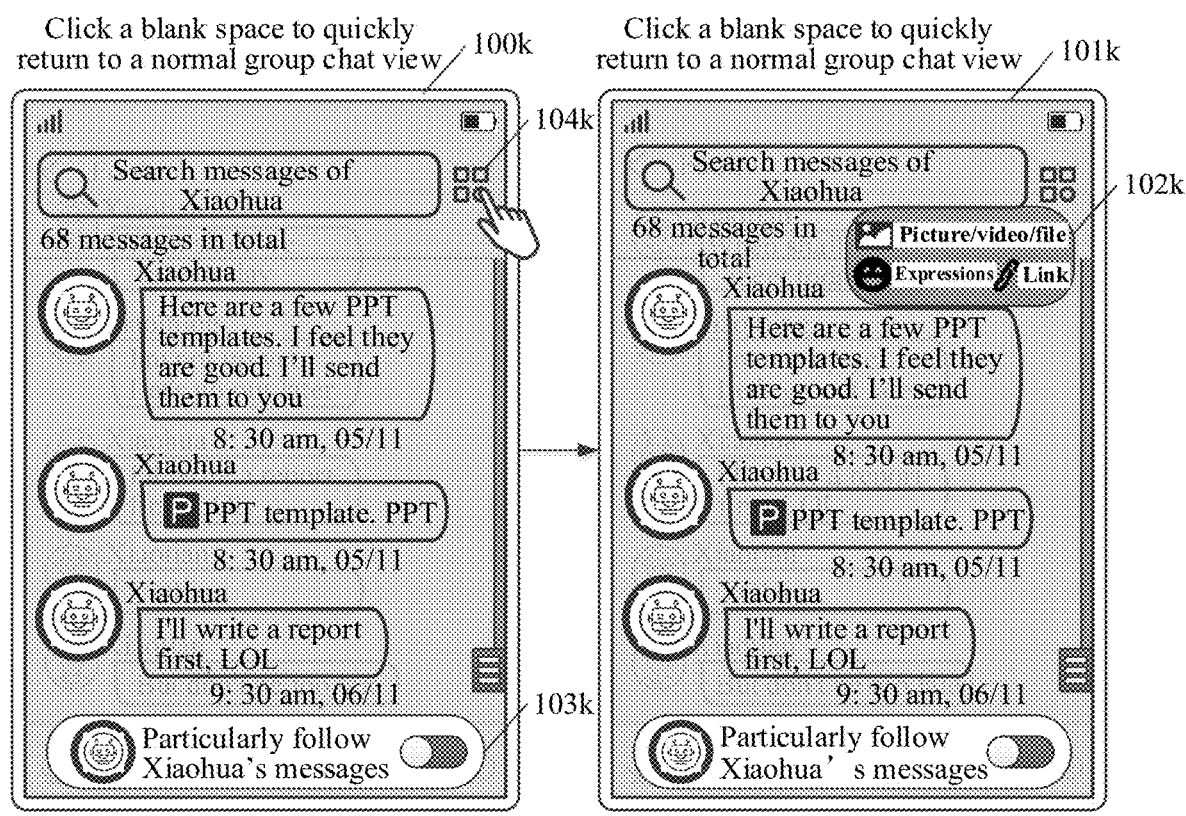
FIG. 15A to FIG. 15B are schematic diagrams of a message classification search interface according to this application.
Figure 15B:
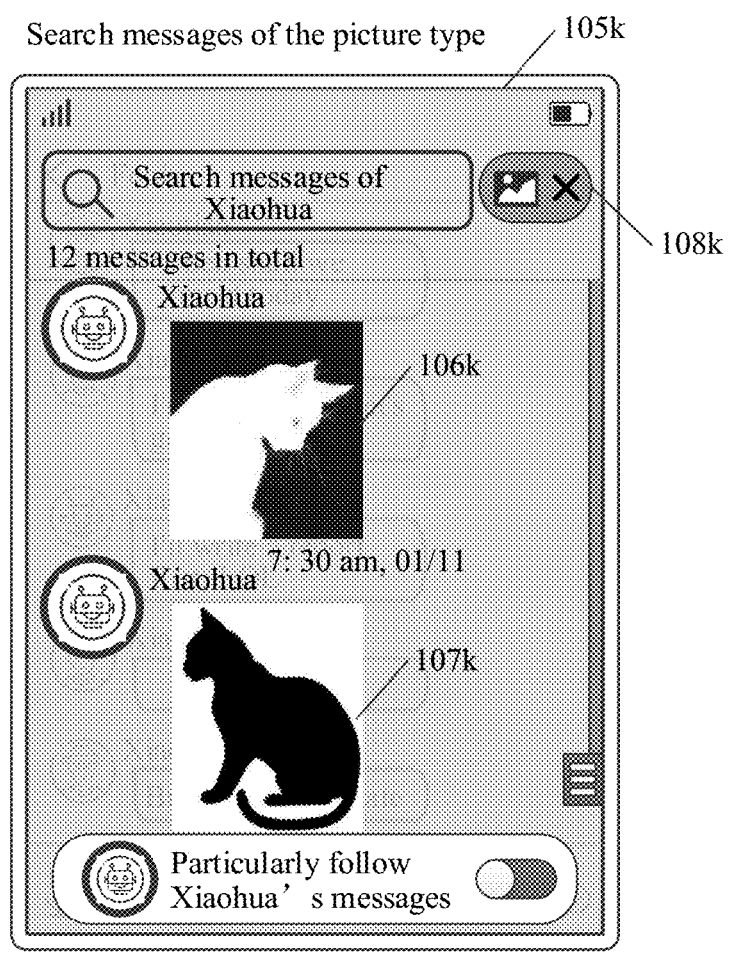

Referring to FIG. 15A to FIG. 15B, FIG. 15A to FIG. 15B are schematic diagrams of a message classification search interface according to this application. As shown in FIG. 15A, interface 100*k* is the interface of the model floating layer used for displaying the social messages (referring to the group messages of Xiaohua here) of the target social object (referring to Xiaohua here). Since Xiaohua is not yet a followed social object, interface 100*k* can also display a follow control 103*k* for Xiaohua. Xiaohua can be set as a followed social object through the follow control 103*k*.

In addition, interface 100*k* also includes a classification control 104*k*. When the classification control 104*k* is clicked, the object device can display interface 101*k*. Interface 101*k* includes a pop-up window 102*k* that displays the message type list. A picture type (namely, the target message type) can be selected in the pop-up window 102*k*. As shown in FIG. 15B, the object device can display interface 105*k*. Interface 105*k* selects and displays group messages 106*k* and 107*k* of the picture type, which are sent by Xiaohua. Interface 105*k* also includes a close control 108*k*. The close control 108*k* can be clicked to return to interface 100*k*.

In one possible implementation, the model floating layer can also be quickly closed on the model floating layer to quickly return to the social interface (it can be understood that returning to the social interface here is not redisplaying the social interface, as the social interface is covered by the model floating layer in the display process of the model floating layer).

For example, according to a closing operation performed on the model floating layer, the object device can quickly close the model floating layer and return to the social interface. In one possible implementation, the closing operation performed on the model floating layer can be a clicking operation performed on a blank region in the model floating layer.

Figure 16:
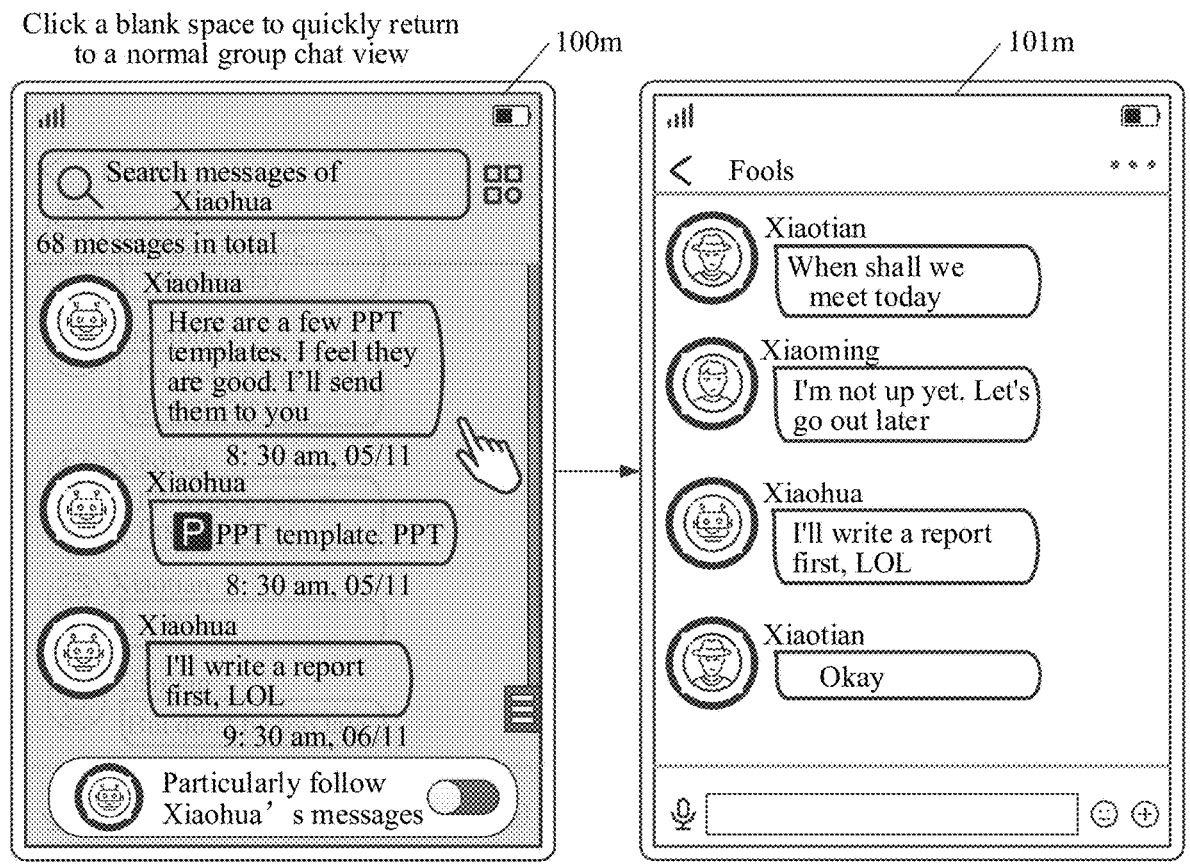
FIG. 16 is a schematic diagram of a message switching interface according to this application.

Referring to FIG. 16, FIG. 16 is a schematic diagram of a message switching interface according to this application. As shown in FIG. 16, interface 100*m* is the interface of the model floating layer. When a blank position on interface 100*m* is clicked, the model floating layer can be quickly closed to return to social interface 101*m* (which refers to the group chat interface of the group "Fools" here).

According to the method provided in this application, a temporary model floating layer can be quickly pulled up in the social interface, and the social messages of the target social object can be quickly aggregated and displayed in this model floating layer, so that users can quickly aggregate and view the social messages of the target social object in the model floating layer through a shortcut gesture without leaving the atmosphere of content interaction, and the users can operate the social messages of the target social object in the temporary model floating layer (such as forwarding, deleting, filtering, and quick positioning and displaying in the social interface), which ensures the consistency of understandings of the users on the social messages and also improves the efficiency of viewing and operating the social messages of the target social objects by the users.

Figure 17:
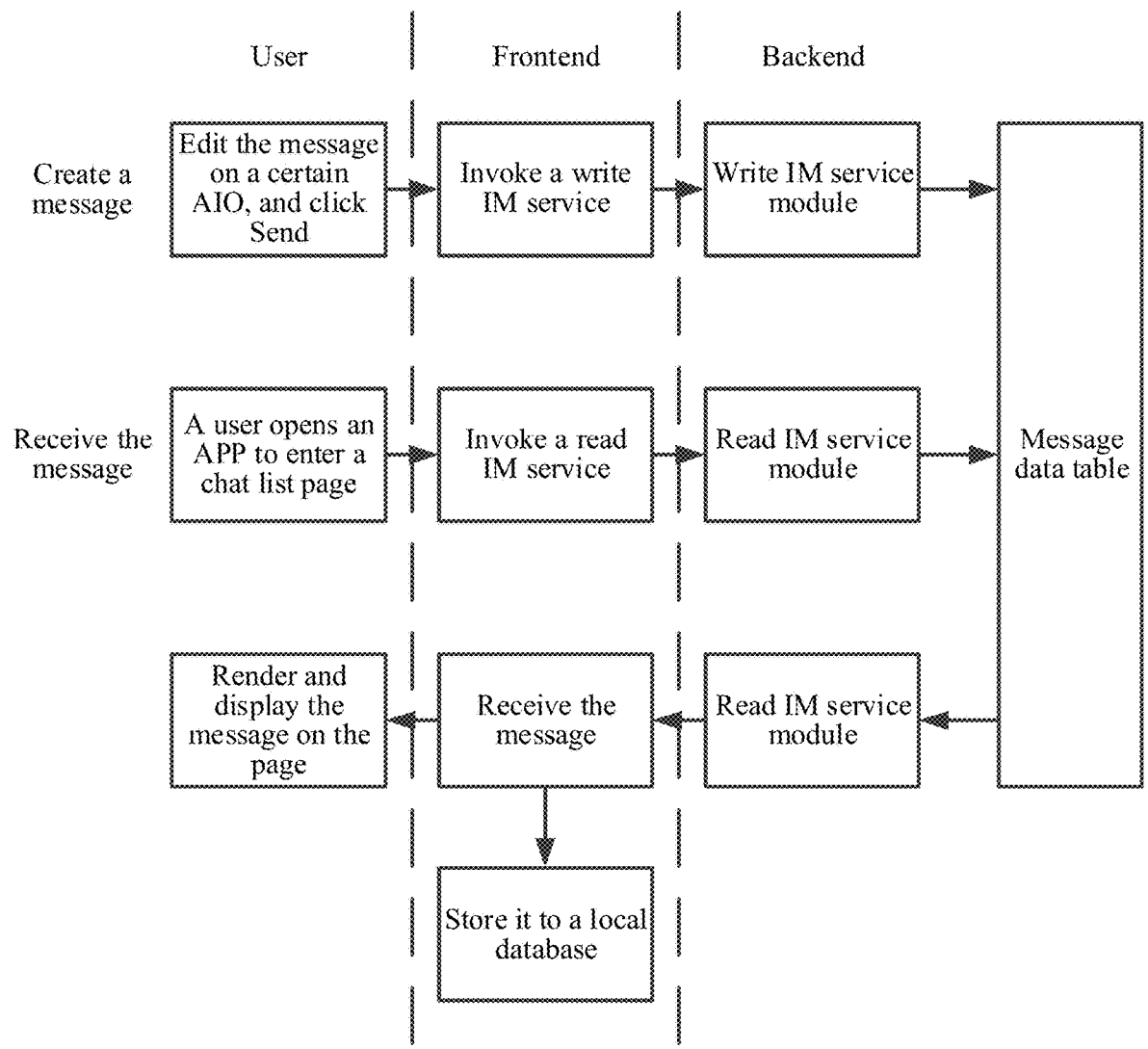
FIG. 17 is a schematic diagram of a scenario of displaying messages according to this application.

Referring to FIG. 17, FIG. 17 is a schematic diagram of a scenario of displaying messages according to this application. As shown in FIG. 17, firstly, a process of creating a message (which can refer to a social message) includes the following: A user (any social object) can edit a message under a certain AIO (such as in a social interface) and click Send, and then a frontend (such as a social platform in an object device) can invoke a write IM service of a backend to provide a room identifier (roomid), a userid (which can be an id of the user sending the message), a content (a content of the message itself), and a type (message type) for the backend. The backend writes, in a message data table through a write IM service module, the message edited and sent by the user (that is, achieving message entering). The IM service exists in the backend.

Furthermore, a process of receiving the message by the frontend includes the following: A user can open an APP (such as the social platform) to enter a chat list page (the social interface), and the frontend can invoke a read IM service of the backend to provide the roomid and the userid (which can be the id of the user holding the object device) for the backend. The backend reads the message from the message data table through the read IM service (namely, achieving message reading). Next, the backend can provide the read message for the frontend through a read IM service module. The frontend receives the message from the backend, renders and displays the message in the interface, and stores the message to a local database of the frontend.

Figure 18:
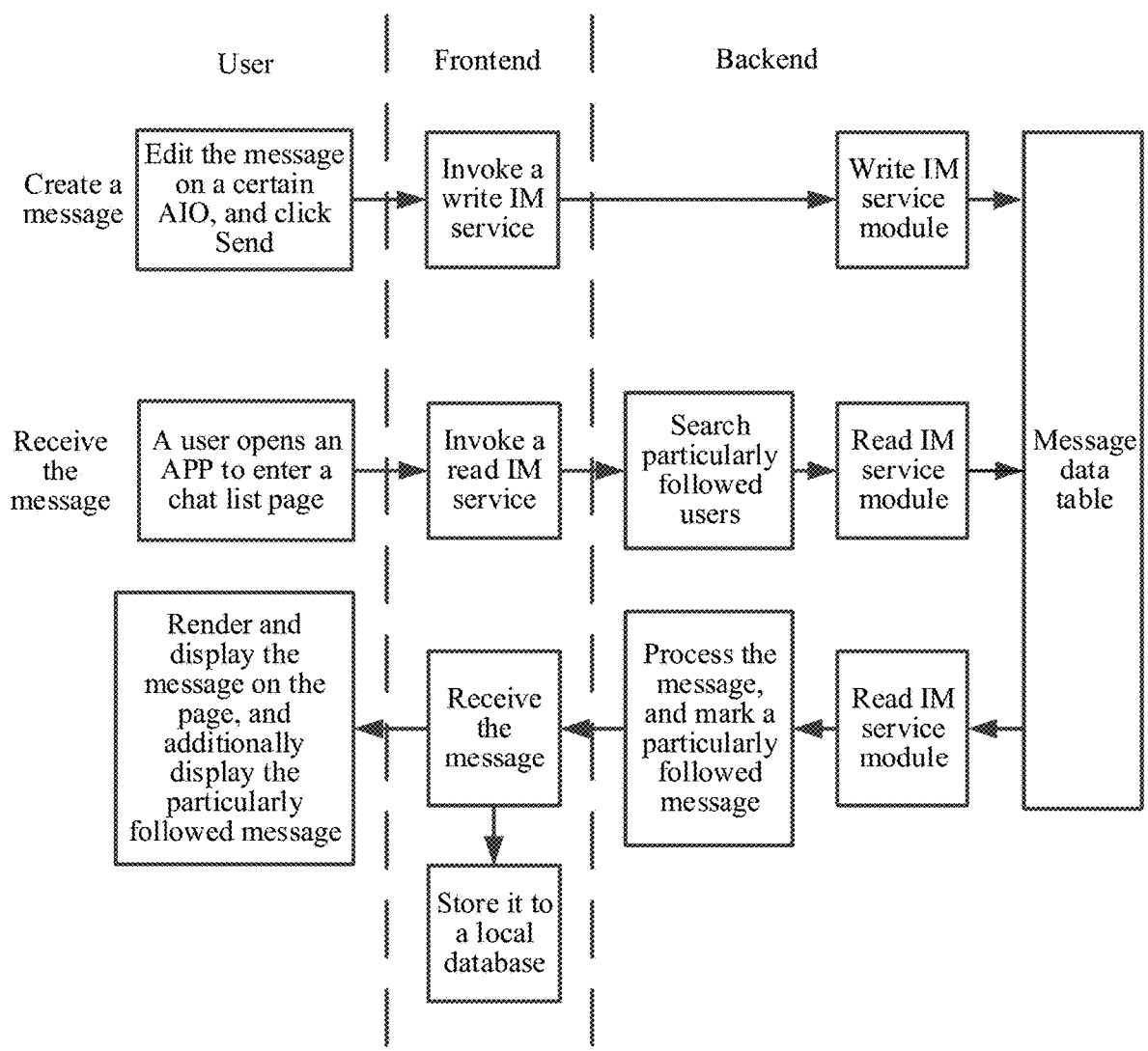
FIG. 18 is a schematic diagram of a scenario of displaying followed messages according to this application.

Referring to FIG. 18, FIG. 18 is a schematic diagram of a scenario of displaying followed messages according to this application. As shown in FIG. 18, a process of creating a message may include the following: A user (which can be a followed social object) can edit a message under a certain AIO (such as in a social interface) and click Send, and then a frontend (such as a social platform in an object device) can invoke a write IM service of a backend to provide a roomid, a userid (which can be an id of the user sending the message), a content (a content of the message itself), and a type (message type) for the backend. The backend writes, in a message data table through a write IM service module, the message edited and sent by the user (that is, achieving message entering).

Furthermore, a process of receiving the message can include the following: A user can open an APP (such as the social platform) to enter a chat list page (such as the social interface), and the frontend invokes a read IM service of the backend. The backend can search for a user that the user particularly follows (such as a followed social object), and then the backend can read messages of the followed social objects from the message data table through a read service module and can process the read messages of the followed social objects through a read IM service module, such as, mark particularly followed messages (namely, the messages of the followed social objects).

Next, the backend can provide the read and marked messages to the frontend, and the frontend can receive the messages and render and display the messages in an interface (such as the social interface). The particularly followed messages can also be additionally displayed (such as reminded through a display control), and the frontend can also store the obtained messages to a local database.

According to the method provided in this application, the followed social object can be set among the several social objects involved in the content aggregation scenario (such as the group chat scenario), and then the social messages of the followed social object are additionally prompted or displayed, facilitating users to quickly grasp a message status of the followed social object in the content aggregation scenario.

Figure 19:
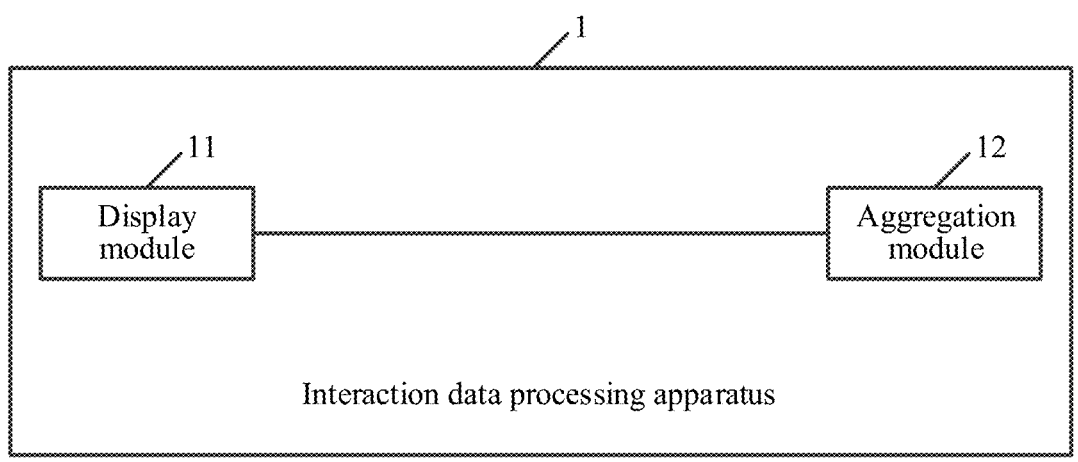
FIG. 19 is a schematic structural diagram of an interaction data processing apparatus according to this application.

Referring to FIG. 19, FIG. 19 is a schematic structural diagram of an interaction data processing apparatus according to this application. The interaction data processing apparatus can be a computer program (including a program code) run on a computer device. For example, the interaction data processing apparatus is an application software. The interaction data processing apparatus can be configured to execute the corresponding steps in the method provided in the embodiments of this application. As shown in FIG. 19, the interaction data processing apparatus 1 may include: a display module 11 and an aggregation module 12.

The display module 11 is configured to display a social interface; the social interface being used for displaying social messages of at least one social object; and the aggregation module 12 is configured to: receive a preset operation performed on a target social object among the at least one social object, and aggregate and display social messages transmitted by the target social object in the social interface.

In one possible implementation, in a following manner, the aggregation module 12 receives the preset operation performed on the target social object among the at least one social object, and aggregates and displays at least one social message transmitted by the target social object in the social interface:

receiving a preset operation of a target social object, and aggregating and displaying, in a model floating layer, social messages transmitted by the target social object in the social interface, the model floating layer being a floating layer independently displayed in the social interface.

In one possible implementation, the social interface contains an object identifier of the target social object.

The receiving a preset operation performed on a target social object among the at least one social object includes: receiving a triggering operation performed on the object identifier of the target social object,
  where the triggering operation performed on the object identifier of the target social object includes any one of the following: performing long press on the object identifier of the target social object, and dragging the object identifier of the target social object along the social interface to a preset region; or performing long press on the object identifier of the target social object, and dragging the object identifier of the target social object by a preset distance along the social interface.

In one possible implementation, in a case that the target social object does not belong to a followed social object, the model floating layer further displays a follow control for the target social object; and
  the above apparatus 1 is further configured to:
  receive a triggering operation performed on the follow control, and set the target social object as a followed social object.

In one possible implementation, the target social object refers to a followed social object among the at least one social object; the social interface displays a prompt control; the prompt control is used for prompting that the followed social object has an unread social message; and
  the receiving a preset operation performed on a target social object among the at least one social object includes: receiving a triggering operation performed on the prompt control.

In one possible implementation, a quantity of followed social objects among the at least one social object is L, and the target social object refers to any one or more of the L followed social objects;
  the prompt control is further used for displaying a quantity of the unread social message; and the unread social message refers to an unread social message transmitted by at least one followed social object among the L followed social objects in the social interface.

In one possible implementation, in a case that a quantity of the target social object is greater than 1, the aggregation module 12 aggregates and displays the social messages transmitted by the target social object in the social interface in a following manner:
  classifying, aggregating and displaying, in response to the triggering operation performed on the prompt control, the unread social message separately corresponding to each target social object.

In one possible implementation, a quantity of the followed social object among the at least one social object is L, and the above apparatus 1 is further configured to:
  display, in the social interface, a message typing status of a social object that is typing a social message among the L followed social objects.

In one possible implementation, the above apparatus 1 is further configured to:
  receive a reply operation performed on the social messages in the model floating layer, and output a virtual keyboard used for replying the operated social messages; and
  receive a reply social message typed in the virtual keyboard, close the model floating layer, and display the reply social message in the social interface, the reply social message being a social message used for replying the operated social messages.

In one possible implementation, the above apparatus 1 is further configured to:
  receive a selection operation performed on the social messages of the target social object in the model floating layer, and output a processing control used for processing the operated social messages; and
  receive a triggering operation performed on the processing control, and process the operated social messages according to a processing manner indicated by the processing control.

In one possible implementation, the model floating layer includes a slider control; the above apparatus is applied to an object device, and the object device includes a device interface; and
  the above apparatus 1 is further configured to:
  receive a swiping operation performed on the slider control, swipe and display the social messages in the model floating layer, and display message sending time of the social messages in the device interface in the slider control.

In one possible implementation, the above apparatus 1 is further configured to:
  receive a positioning operation performed on the social messages in the model floating layer, close the model floating layer, and position and highlight the operated social messages in the social interface.

In one possible implementation, the above apparatus 1 is further configured to:
  receive a search content entered in the model floating layer; and
  select and display, in the model floating layer, a social message transmitted by the target social object and containing the search content.

In one possible implementation, the above apparatus 1 is further configured to:
  display a message type list in the model floating layer, the message type list containing message types of the social messages; and
  receive a selection operation performed on a target message type in the message type list, and select and display, in the model floating layer, a social message transmitted by the target social object and belonging to the target message type.

According to one embodiment of this application, the steps of the interaction data processing method shown in FIG. 3 may be performed by the respective modules in the interaction data processing apparatus 1 shown in FIG. 19. For example, S101 shown in FIG. 3 can be executed by the display module 11 in FIG. 19, and S102 shown in FIG. 3 can be executed by the aggregation module 12 in FIG. 19.

This application can display a social interface; the social interface being used for displaying social messages of at least one social object; and receive a preset operation performed on a target social object among the at least one social object, and aggregate and display social messages transmitted by the target social object in the social interface. Therefore, the method provided in this application can directly perform a quick displaying operation (for example, the preset operation) on the social messages of the target social object in the social interface, and quickly aggregate and display the social messages of the target social object in response to the preset operation, which improves the efficiency of displaying the social messages of the target social object and enriches the method for triggering and displaying the social messages of the target social object.

According to one embodiment of this application, the respective modules in the interaction data processing apparatus 1 shown in FIG. 19 may be separately or wholly combined into one or several other units, or one (or more)

of the units herein may further be divided into multiple subunits of smaller functions. Same operations can be implemented, and implementation of the technical effects of the embodiments of this application is not affected. The foregoing modules are divided based on logical functions. In an actual application, a function of one module may be implemented by multiple units, or functions of multiple modules are implemented by one unit. In other embodiments of this application, the interaction data processing apparatus 1 may also include other units. In an actual application, these functions may also be cooperatively implemented by other units and may be cooperatively implemented by multiple units.

According to one embodiment of this application, by running, on processing elements including a central processing unit (CPU), a random access memory (RAM), a read-only memory (ROM), and the like and a general-purpose computer device, such as a computer, for element storage, a computer program (including a program code) that can execute all the steps involved in the corresponding method shown in FIG. 3, the interaction data processing apparatus 1 shown in FIG. 19 may be constructed and an interaction data processing method according to the embodiments of this application may be implemented. The above computer program may be recorded in, for example, a computer-readable storage medium, and may be loaded into the above computing device by using the computer-readable storage medium and run in the computing device.

Figure 20:
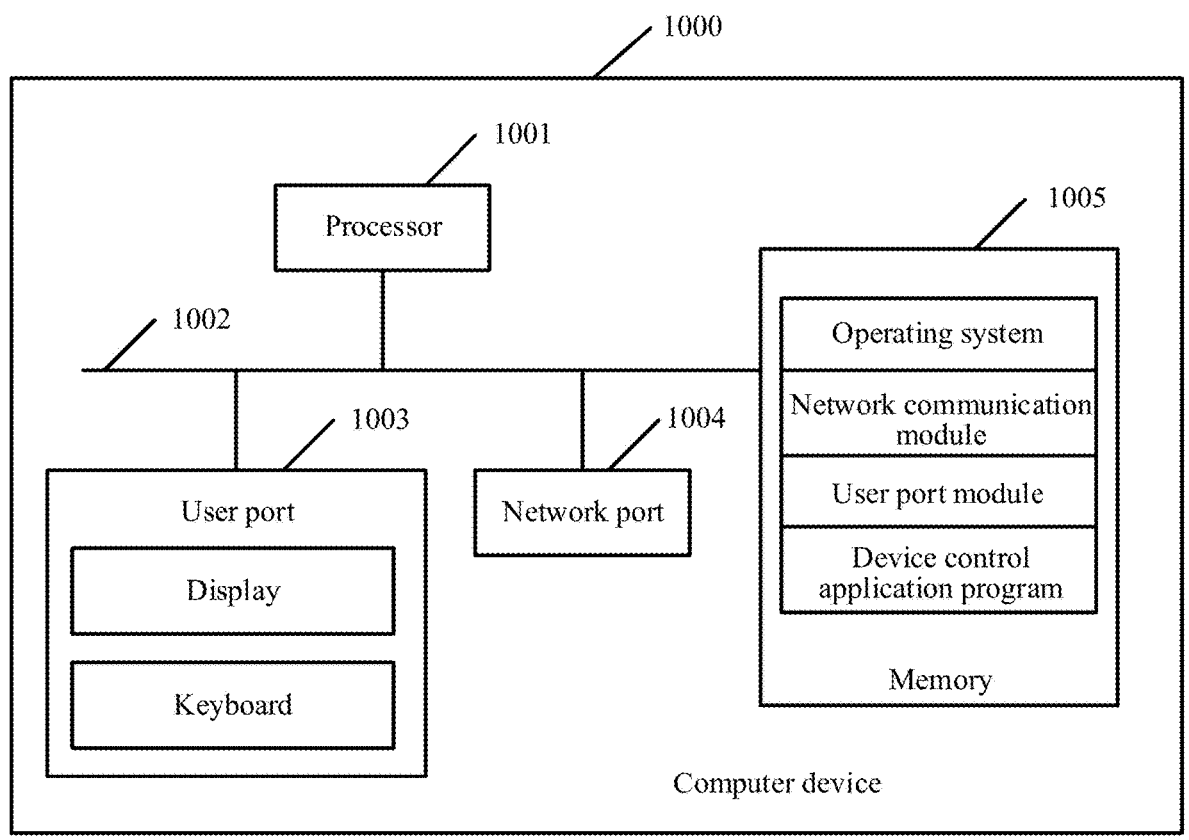
FIG. 20 is a schematic structural diagram of a computer device according to this application.

Referring to FIG. 20, FIG. 20 is a schematic structural diagram of a computer device according to this application. As shown in FIG. 20, the computer device 1000 may include: a processor 1001, a network port 1004, and a memory 1005. In addition, the computer device 1000 may also include: a user port 1003 and at least one communication bus 1002. The communications bus 1002 is configured to implement connection and communication between these components. The user port 1003 may include a display and a keyboard. Optionally, the user port 1003 may further include a standard wired port and wireless port. In one possible implementation, the network interface 1004 may include a standard wired port and/or wireless port (for example, a WI-FI port). The memory 1005 may be a high-speed RAM memory, or may be a non-volatile memory, for example, at least one magnetic disk memory. In one possible implementation, the memory 1005 may also be at least one storage apparatus that is located far away from the foregoing processor 1001. As shown in FIG. 20, the memory 1005 used as a computer storage medium may include an operating system, a network communications module, a user interface module, and a device-control application program.

In the computer device 1000 shown in FIG. 20, the network port 1004 can provide a network communication function. The user port 1003 is mainly used for providing an input port for a user. The processor 1001 may be configured to invoke a device control application program stored in the memory 1005 to perform the following operations:

displaying a social interface; the social interface being used for displaying social messages of at least one social object; and receiving a preset operation performed on a target social object among the at least one social object, and aggregating and displaying social messages transmitted by the target social object in the social interface.

The actions performed by the computer device 1000 can be similar to those described above in the example interaction data processing methods described in connection with FIG. 3, as well as the interaction data processing apparatus 1 described in connection with FIG. 19, which will not be further described in detail here. In addition, the description of beneficial effects of the same method are not described herein again.

This application further provides a computer-readable storage medium. The computer-readable storage medium stores the foregoing computer program run in the interaction data processing apparatus 1, and the computer program includes program instructions. When a processor executes the program instructions, the process can implement the foregoing interaction data processing method described above in connection with FIG. 3, so it will not be described in detail here. In addition, the description of beneficial effects of the same method are not described herein again. For technical details that are not disclosed in the computer storage medium embodiments of this application, refer to the descriptions of the method embodiments of this application.

As an example, the program instructions may be deployed on a computer device for execution, or on a plurality of computer devices located at one site for execution, or on a plurality of computer devices distributed at a plurality of sites and interconnected by a communication network for execution, and the plurality of computer devices distributed at the plurality of sites and interconnected by the communication network can form a block chain network.

The above computer-readable storage medium can be an internal storage unit of the interaction data processing apparatus provided by any of the aforementioned embodiments or an internal storage unit of the foregoing computer device, such as a hard disk or an internal memory of the computer device. The computer-readable storage medium can also be an external storage device of the computer device, such as a plug-in hard disk, smart media card (SMC), a secure digital (SD) card, and a flash card, provided on the computer device. Further, the computer-readable storage medium can also include both the internal storage unit of the computer device and the external storage device. The computer-readable storage medium can also be configured to store the computer program and other programs and data required by the computer device. The computer-readable storage medium can also be configured to temporarily store data that has been or is about to be output.

This application provides a computer program product. The computer program product includes a computer program. The computer program is stored in a computer-readable storage medium. A processor of a computer device reads the computer program from the computer-readable storage medium and executes the computer program, causing the computer device to implement the interaction data processing method described above in connection with FIG. 3, so it will not be described in detail here. In addition, the description of beneficial effects of the same method are not described herein again. For technical details that are not disclosed in the computer-readable storage medium embodiments of this application, refer to the descriptions of the method embodiments of this application.

The terms such as "first" and "second" in this specification, claims, and the accompanying drawings of the embodiments of this application are used to distinguish different objects and are not used to describe a specific sequence. In addition, the term "include" and any variant thereof are intended to cover a non-exclusive inclusion. For example, a process, method, apparatus, product, or device that includes a series of steps or modules is not limited to the listed steps or modules; and instead, further optionally includes a step or module that is not listed, or further optionally includes another step or unit that is intrinsic to the process, method, apparatus, product, or device.

A person of ordinary skill in the art may understand that, units and algorithm steps of the examples described in the foregoing embodiments disclosed here may be implemented by electronic hardware, computer software, or a combination thereof. To clearly describe the interchangeability between the hardware and the software, the foregoing has generally described compositions and steps of each example based on functions. Whether these functions are implemented as hardware or software depends on particular application and design constraint conditions of the technical solutions. A person skilled in the art may use different methods to implement the described functions for each particular application, but it should not be considered that the implementation goes beyond the scope of this application.

The method and related apparatus provided in the embodiments of this application are described with reference to the method flowchart and/or schematic structural diagram provided in the embodiments of this application. Specifically, each flow and/or block in the method flowchart and/or structural diagram, as well as a combination of flows and/or blocks in the flowchart and/or block diagram, can be implemented by computer program instructions. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more flows in the flowcharts and/or in one or more blocks in the schematic structural diagrams. These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more flows in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more flows in the flowcharts and/or in one or more blocks in the schematic structural diagrams.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. An interaction data processing method performed by an object device and comprising:
    displaying a social interface, the social interface being utilized to display at least one social message of a group conversation associated with a plurality of social objects and a user of the social interface; and
    receiving a preset operation performed on a target social object among the plurality of social objects associated with the group conversation, and aggregating and displaying, in an independently displayed component of the social interface, one or more social messages transmitted by the target social object in the group conversation excluding at least one first social message not transmitted by the target social object in the at least one social message of the group conversation.

2. The method according to claim 1, wherein
the independent displayed component of the social interface comprises a model floating layer.

3. The method according to claim 2,
wherein the target social object is not a followed social object, and the model floating layer further displays a follow control;
the method further comprising:
    receiving a triggering operation performed on the follow control, and setting the target social object as a followed social object.

4. The method according to claim 2, further comprising:
receiving a reply operation performed on at least one of the one or more social messages in the model floating layer, and outputting a virtual keyboard; and
receiving a reply social message typed in the virtual keyboard, closing the model floating layer, and displaying the reply social message in the social interface.

5. The method according to claim 2, further comprising:
receiving a selection operation performed on at least one of the one or more social messages of the target social object in the model floating layer, and outputting a processing control; and
receiving a triggering operation performed on the processing control, and processing the at least one of the one or more social messages according to a processing manner indicated by the processing control.

6. The method according to claim 2,
wherein the model floating layer includes a slider control, and the object device includes a device interface;
the method further comprising:
    receiving a swiping operation performed on the slider control, swiping and displaying the one or more social messages in the model floating layer, and displaying, in the slider control, a message sending time of each of the one or more social messages in the device interface.

7. The method according to claim 2, further comprising:
receiving a positioning operation performed on at least one of the one or more social messages in the model floating layer, closing the model floating layer, and positioning and highlighting the at least one of the one or more social messages in the social interface.

8. The method according to claim 2, further comprising:
receiving a search content entered in the model floating layer; and
selecting and displaying, in the model floating layer, one of the one or more social messages transmitted by the target social object and containing the search content.

9. The method according to claim 2, further comprising:
displaying a message type list in the model floating layer, the message type list containing a message type of each of the one or more social messages; and
receiving a selection operation performed on a target message type in the message type list, and selecting and displaying, in the model floating layer, at least one of the one or more social messages transmitted by the target social object and belonging to the target message type.

10. The method according to claim 1, wherein:
the social interface contains an object identifier of the target social object; and
receiving the preset operation performed on the target social object includes receiving a triggering operation performed on the object identifier of the target social object, the triggering operation performed includes:
performing long press on the object identifier of the target social object, and dragging the object identifier of the target social object along the social interface to a preset region; or
performing long press on the object identifier of the target social object, and dragging the object identifier of the target social object along the social interface by a preset distance.

11. The method according to claim 1, wherein:
the target social object is a followed social object among the plurality of social objects, and the social interface displays a prompt control configured to prompt that the followed social object has one or more unread social messages; and
receiving the preset operation performed on the target social object includes receiving a triggering operation performed on the prompt control.

12. The method according to claim 11, wherein:
the plurality of social objects includes L followed social objects, and the target social object is one or more of the L followed social objects; and
the prompt control is further configured to display a quantity of the one or more unread social messages, and the one or more unread social messages include an unread social message transmitted by at least one of the L followed social objects in the social interface.

13. The method according to claim 12, wherein:
the L followed social objects include two or more target social objects; and
aggregating and displaying the one or more social messages transmitted by the target social object in the social interface includes:
classifying, aggregating, and displaying, in response to the triggering operation performed on the prompt control, the unread social messages corresponding to the two or more target social object, respectively.

14. The method according to claim 11,
herein the plurality of social objects includes L followed social objects;
the method further comprising:
displaying, in the social interface, a message typing status of one of the L followed social objects that is typing a social message.

15. A computer device comprising:
one or more processors; and
one or more memories storing one or more computer programs that, when executed by the one or more processors, cause the one or more processors to:
display a social interface, the social interface being utilized to display at least one social message of a group conversation associated with a plurality of social objects and a user of the social interface; and
receive a preset operation performed on a target social object among the plurality of social objects associated with the group conversation, and aggregate and display, in an independently displayed component of the social interface, one or more social messages transmitted by the target social object in the group conversation excluding at least one first social message not transmitted by the target social object in the at least one social message of the group conversation.

16. The device according to claim 15, wherein
the independently displayed component of the social interface comprises a model floating layer.

17. The device according to claim 16, wherein:
the target social object is not a followed social object, and the model floating layer further displays a follow control; and
the one or more computer programs further cause the one or more processors to:
receive a triggering operation performed on the follow control, and set the target social object as a followed social object.

18. The device according to claim 15, wherein:
the social interface contains an object identifier of the target social object; and
the one or more computer programs further cause the one or more processors to:
receive a long press on the object identifier of the target social object, and drag the object identifier of the target social object along the social interface to a preset region; or
receive a long press on the object identifier of the target social object, and drag the object identifier of the target social object along the social interface by a preset distance.

19. The device according to claim 15, wherein:
the target social object is a followed social object among the at least one social object, and the social interface displays a prompt control configured to prompt that the followed social object has one or more unread social messages; and
the one or more computer programs further cause the one or more processors to receive a triggering operation performed on the prompt control.

20. A non-transitory computer-readable storage medium storing one or more computer programs that, when executed by one or more processors, cause the one or more processors to:
display a social interface, the social interface being utilized to display at least one social message of a group conversation associated with a plurality of social objects and a user of the social interface; and
receive a preset operation performed on a target social object among the plurality of social objects associated with the group conversation, and aggregate and display, in an independently displayed component of the social interface, one or more social messages transmitted by the target social object in the group conversation excluding at least one first social message not transmitted by the target social object in the at least one social message of the group conversation.

* * * * *